US012736759B2

(12) United States Patent
Takezaki

(10) Patent No.: US 12,736,759 B2
(45) Date of Patent: Sep. 15, 2026

(54) OPTICAL FIBER ASSEMBLY, PLATE, AND OPTICAL MODULE

(71) Applicant: HAKUSAN INC., Ishikawa (JP)

(72) Inventor: Motohito Takezaki, Ishikawa (JP)

(73) Assignee: HAKUSAN INC., Ishikawa (JP)

( * ) Notice: Subject to any disclaimer, the term of this patent is extended or adjusted under 35 U.S.C. 154(b) by 143 days.

(21) Appl. No.: 18/564,867

(22) PCT Filed: Jun. 21, 2022

(86) PCT No.: PCT/JP2022/024765
§ 371 (c)(1),
(2) Date: Nov. 28, 2023

(87) PCT Pub. No.: WO2022/270510
PCT Pub. Date: Dec. 29, 2022

(65) Prior Publication Data

US 2024/0255710 A1 Aug. 1, 2024

(30) Foreign Application Priority Data

Jun. 21, 2021 (JP) ................................ 2021-102787

(51) Int. Cl.
*G02B 6/38* (2006.01)
*G02B 6/36* (2006.01)

(52) U.S. Cl.
CPC ......... *G02B 6/3885* (2013.01); *G02B 6/3636* (2013.01); *G02B 6/3644* (2013.01); *G02B 6/3861* (2013.01)

(58) Field of Classification Search
CPC .. G02B 6/3885; G02B 6/3636; G02B 6/3644; G02B 6/3861
See application file for complete search history.

(56) References Cited

U.S. PATENT DOCUMENTS 5,430,819 A 7/1995 Sizer, II et al.
10,809,472 B2 * 10/2020 Neukirch .............. G02B 6/423
(Continued)

FOREIGN PATENT DOCUMENTS

JP 2000098186 A 4/2000
JP 2001-174666 A 6/2001
(Continued)

OTHER PUBLICATIONS

International Search Report (ISR) dated Aug. 16, 2022 filed in PCT/JP2022/024765.
(Continued)

*Primary Examiner* — Rhonda S Peace
(74) *Attorney, Agent, or Firm* — RANKIN, HILL & CLARK LLP

(57) ABSTRACT

[Problem] To provide an optical fiber assembly that does not reduce connection loss even when an optical connector is mounted on a substrate and reflow soldering is performed thereon.

[Solution] An optical fiber assembly according to the present invention has: a plate-like ferrule 100 that is formed from a ceramic plate and that has an optical fiber insertion hole 103 and a guide hole 102 for insertion of a guide pin; and an optical fiber 11 inserted into the optical fiber insertion hole 103 of the ferrule 100. The optical fiber 11 is firmly fixed to the optical fiber insertion hole 103 of the ferrule 100 by means of an adhesive filled in the optical fiber insertion hole 103.

25 Claims, 13 Drawing Sheets

(56) References Cited

U.S. PATENT DOCUMENTS

| | | | | |
|---|---|---|---|---|
| 2005/0069265 | A1 | 3/2005 | Lange et al. | |
| 2012/0141065 | A1 | 6/2012 | Oguri et al. | |
| 2013/0108221 | A1 * | 5/2013 | Xie | G02B 6/3644 385/82 |
| 2022/0137303 | A1 | 5/2022 | Otomitsu et al. | |
| 2024/0255710 | A1 * | 8/2024 | Takezaki | G02B 6/4239 |
| 2024/0272377 | A1 * | 8/2024 | Kobayashi | G02B 6/42 |
| 2024/0385389 | A1 * | 11/2024 | Takezaki | G02B 6/3854 |

FOREIGN PATENT DOCUMENTS

| | | | |
|---|---|---|---|
| JP | 2002-350680 | A | 12/2002 |
| JP | 2003-138044 | A | 5/2003 |
| JP | 2003-185886 | A | 7/2003 |
| JP | 2004-29415 | A | 1/2004 |
| JP | 2004-101990 | A | 4/2004 |
| JP | 2007-212973 | A | 8/2007 |
| JP | 2014-240958 | A | 12/2014 |
| WO | 03/087907 | A1 | 10/2003 |
| WO | 2020230363 | A1 | 11/2020 |

OTHER PUBLICATIONS

Japanese Office Action (JPOA) dated in Jul. 7, 2026 and issued for Japanese patent application No. 2025-140987.

* cited by examiner

[Fig1]
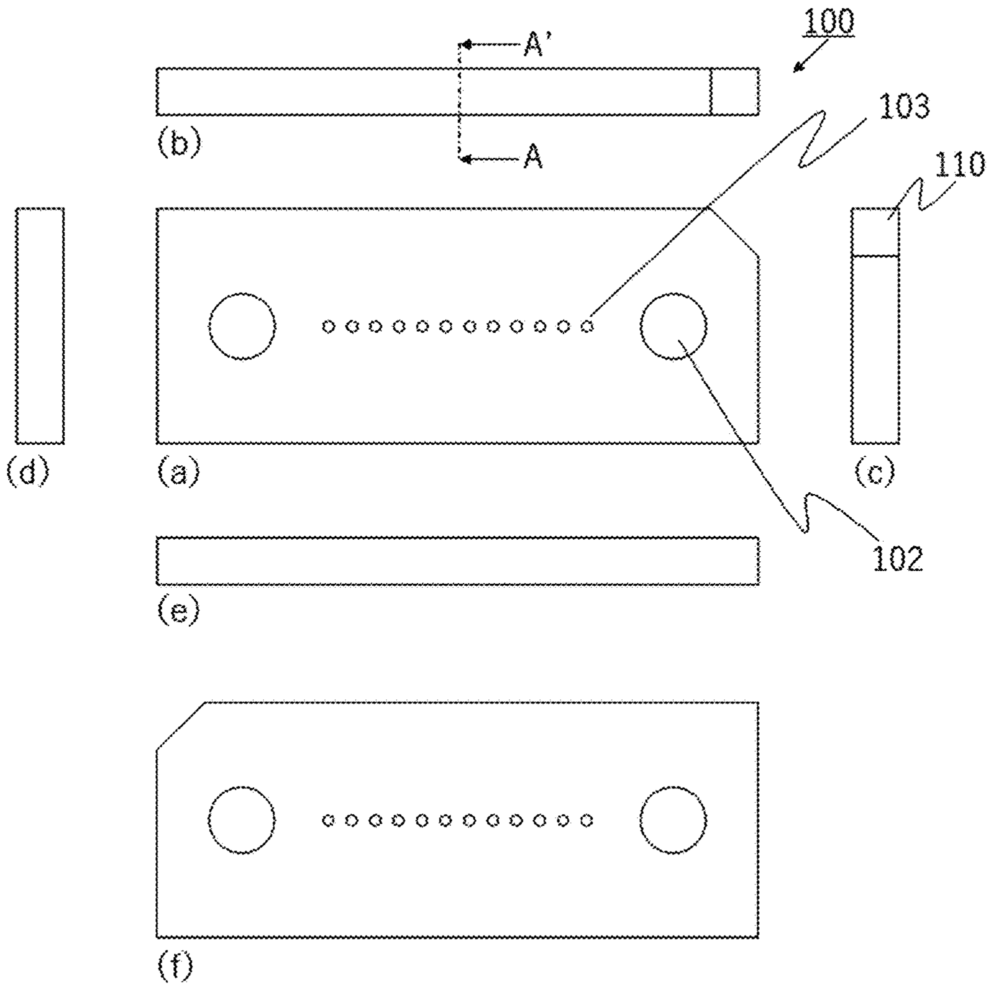
[Fig2]
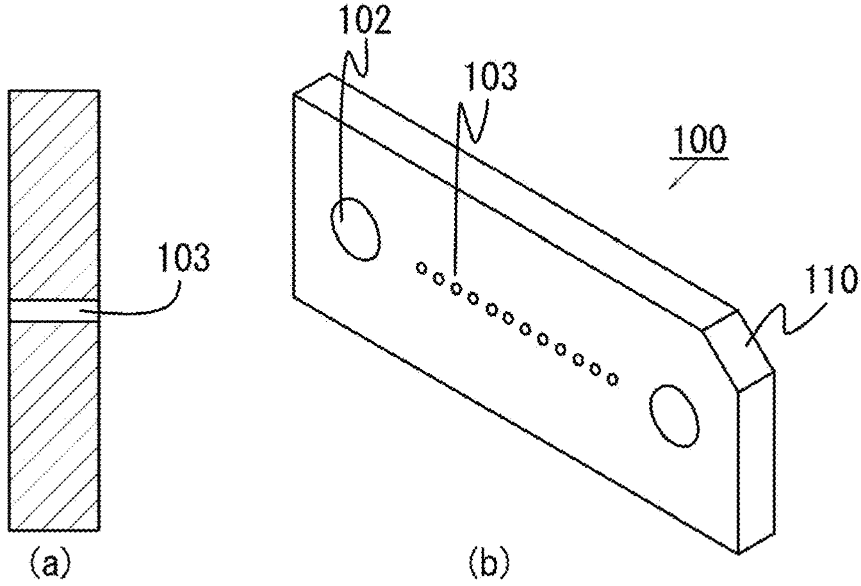

[Fig3]
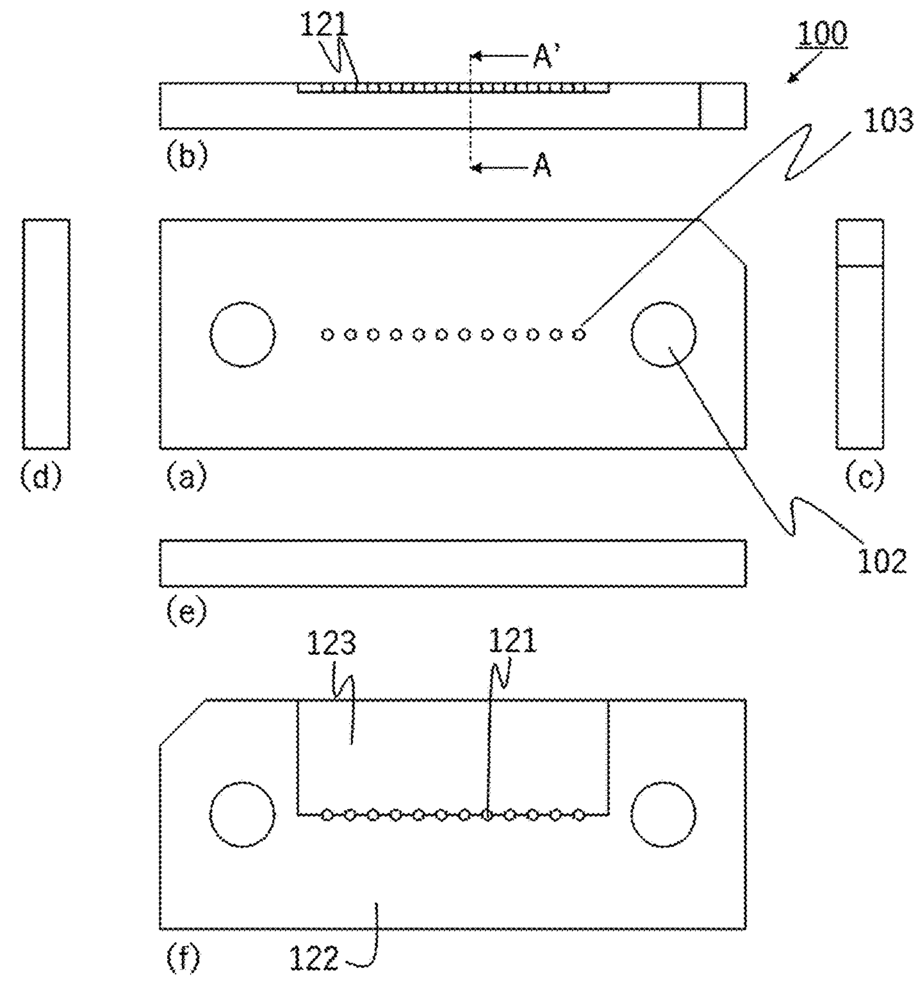
[Fig4]
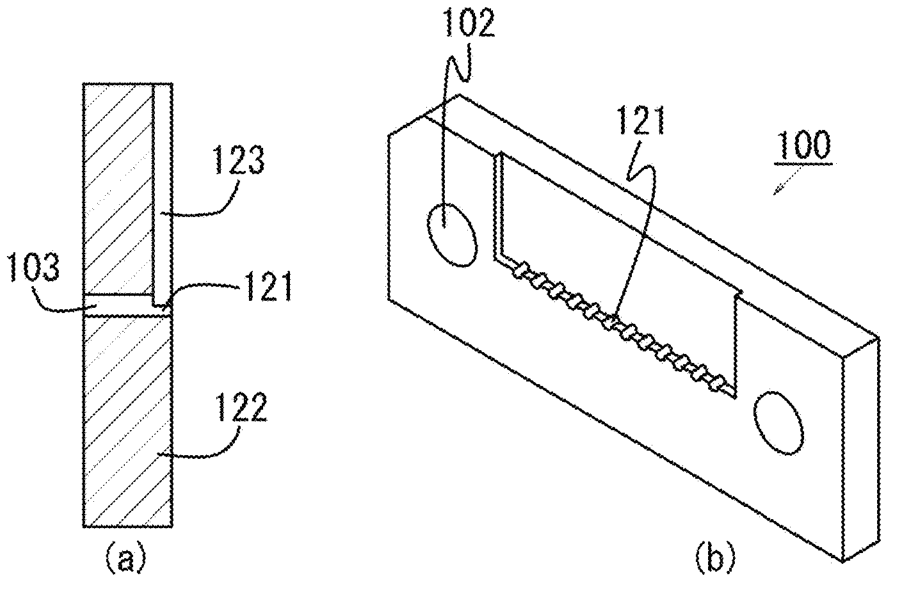

[Fig5]
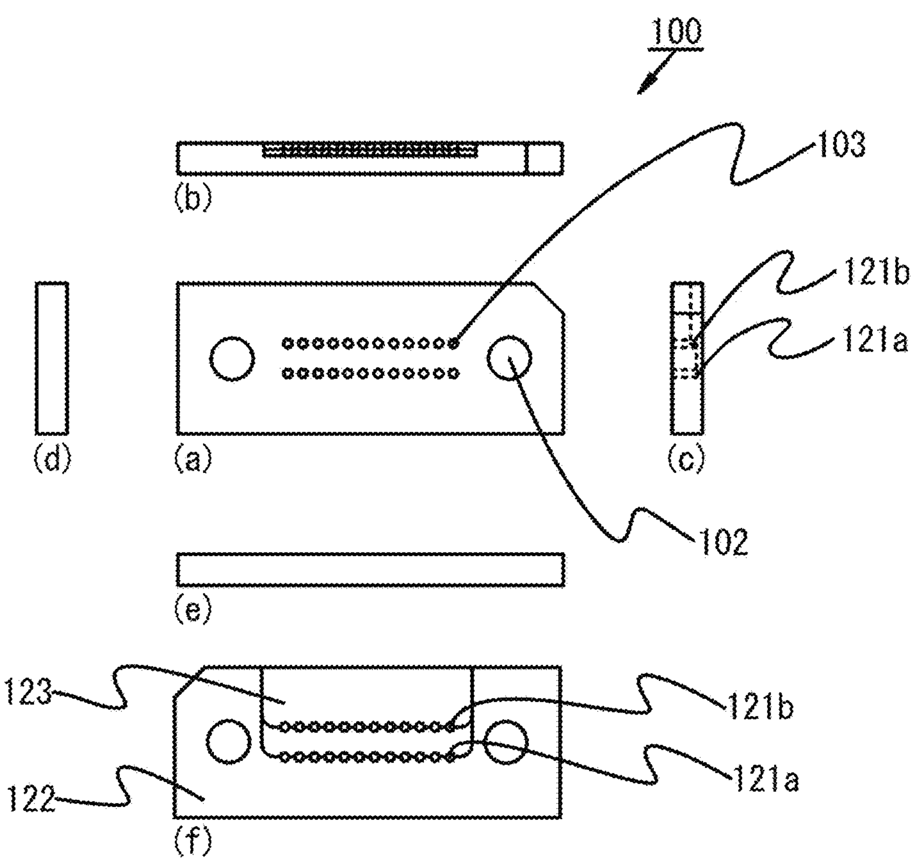
[Fig6]
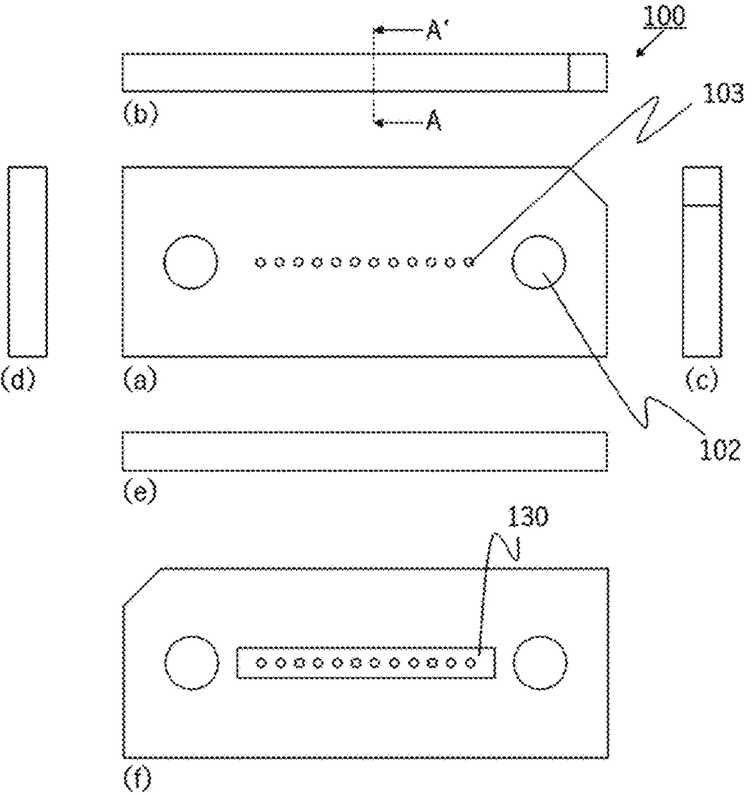

[Fig7]
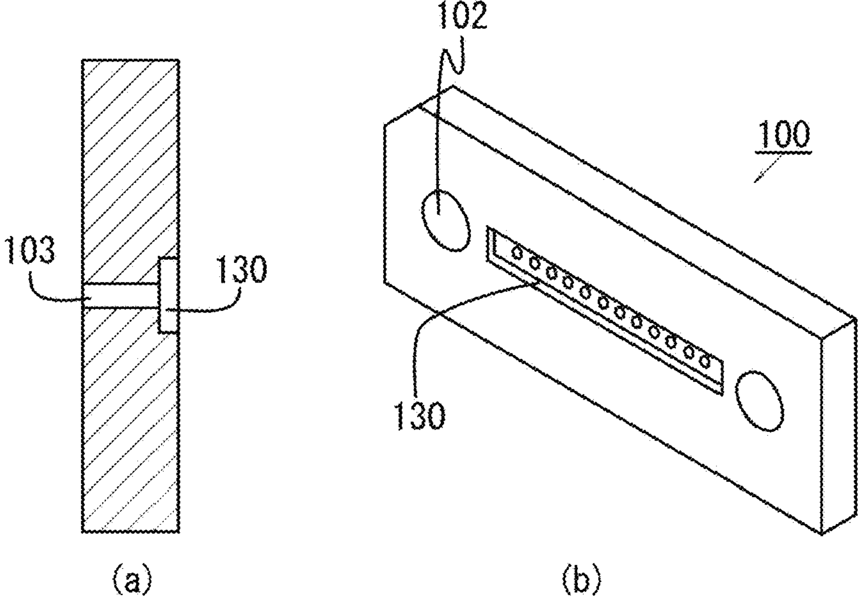
[Fig8]
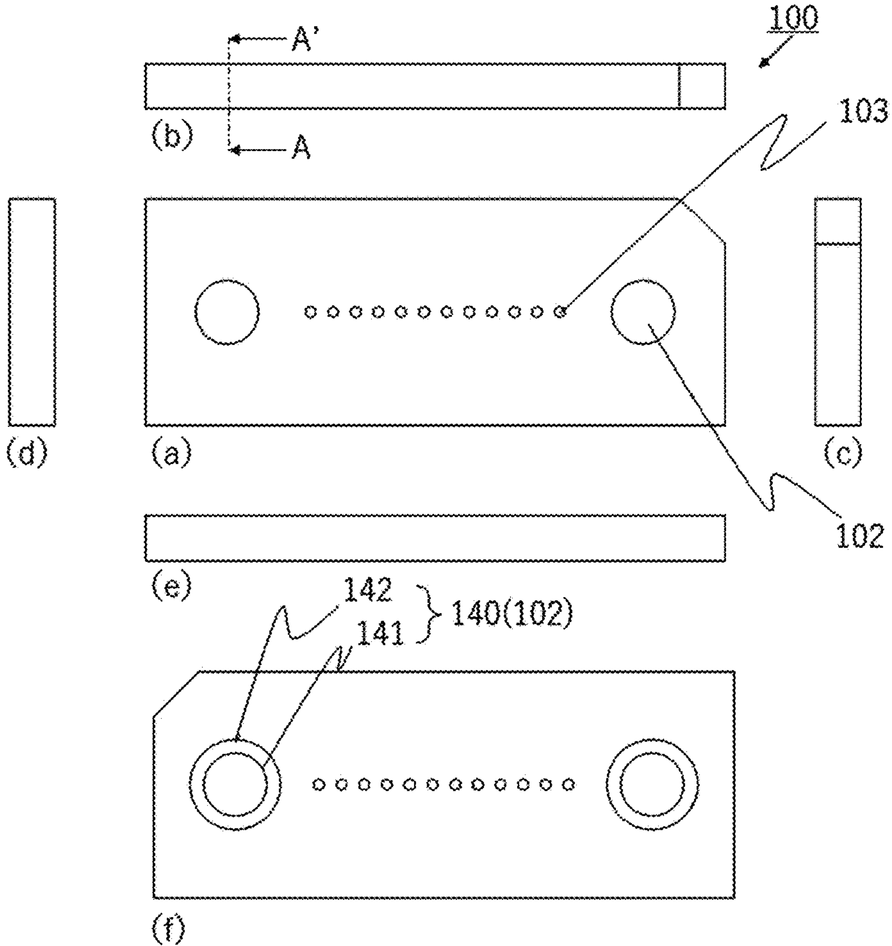

[Fig9]
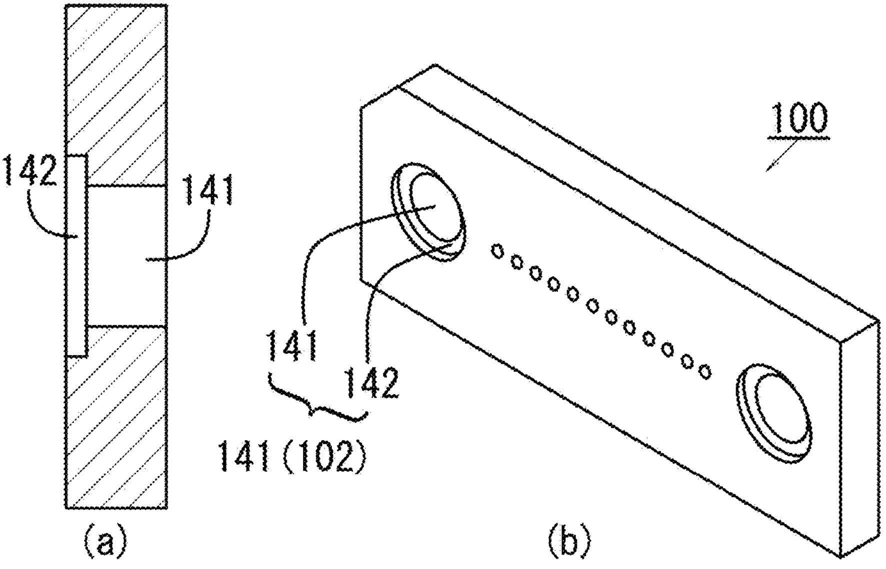
[Fig10]
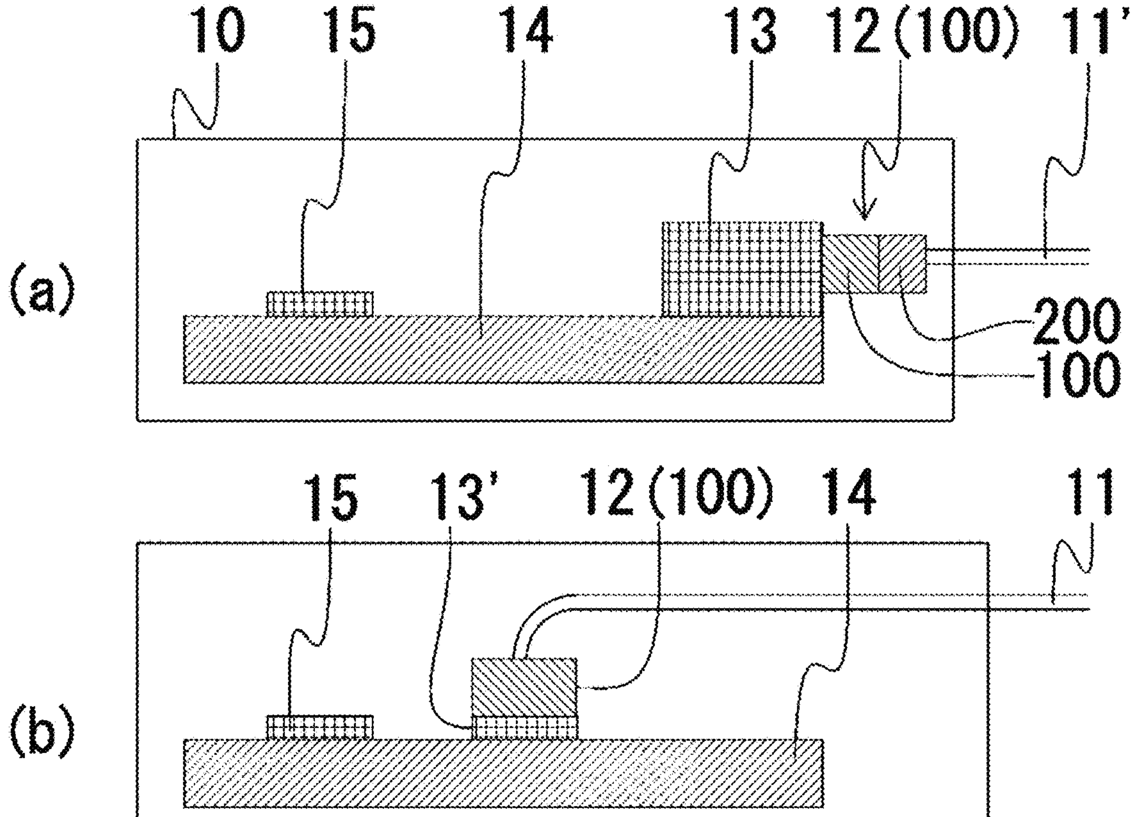

[Fig11]
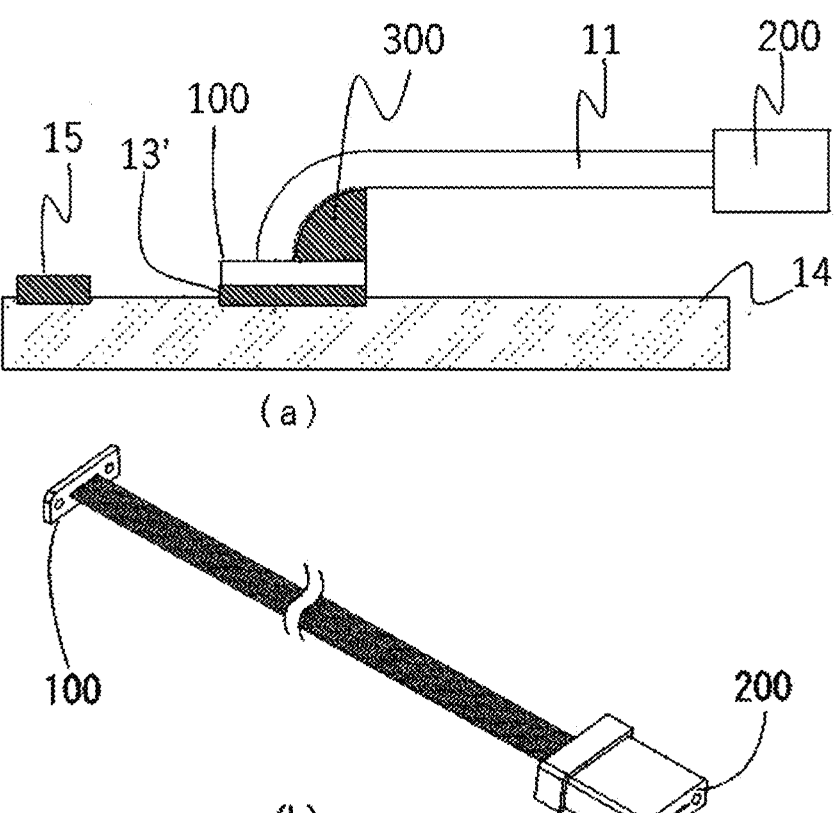
[Fig12]
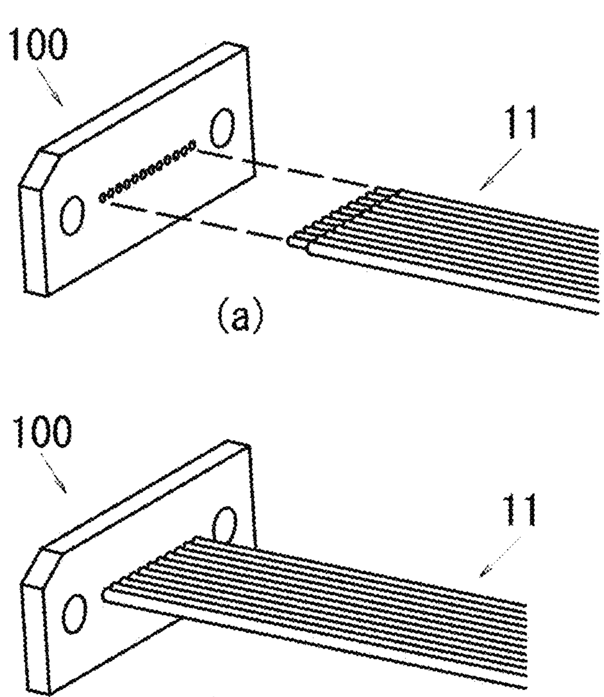

[Fig13]
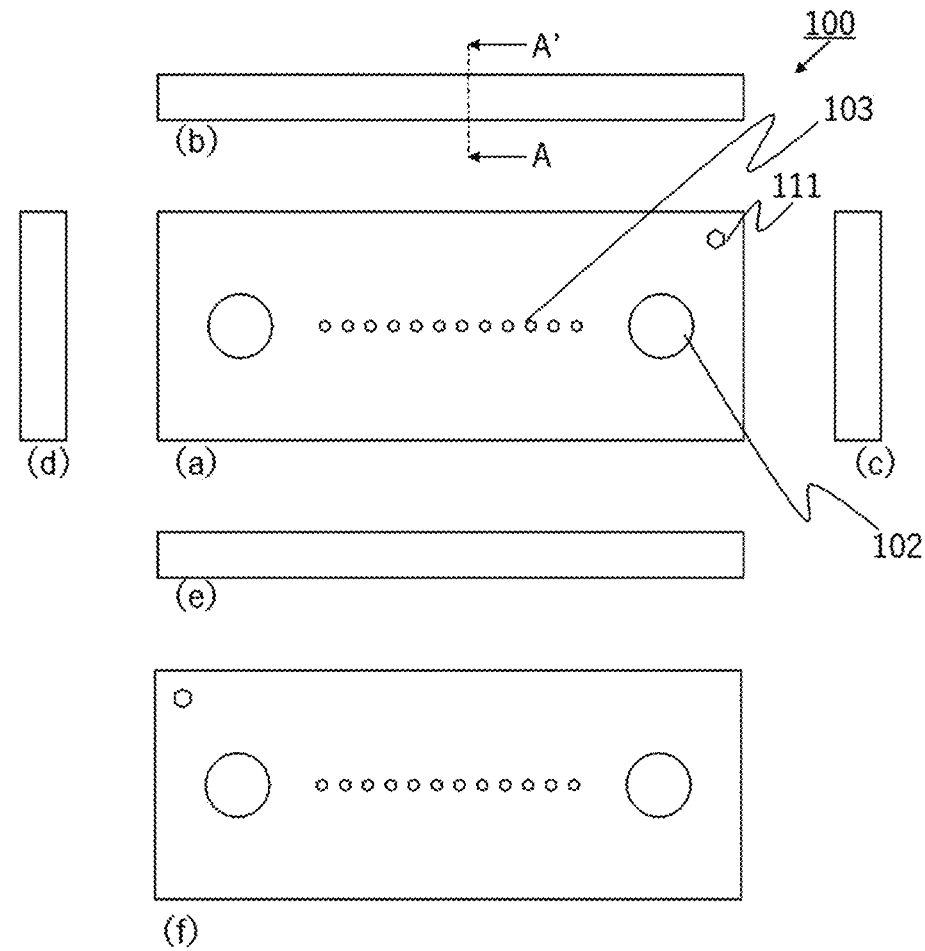
[Fig14]
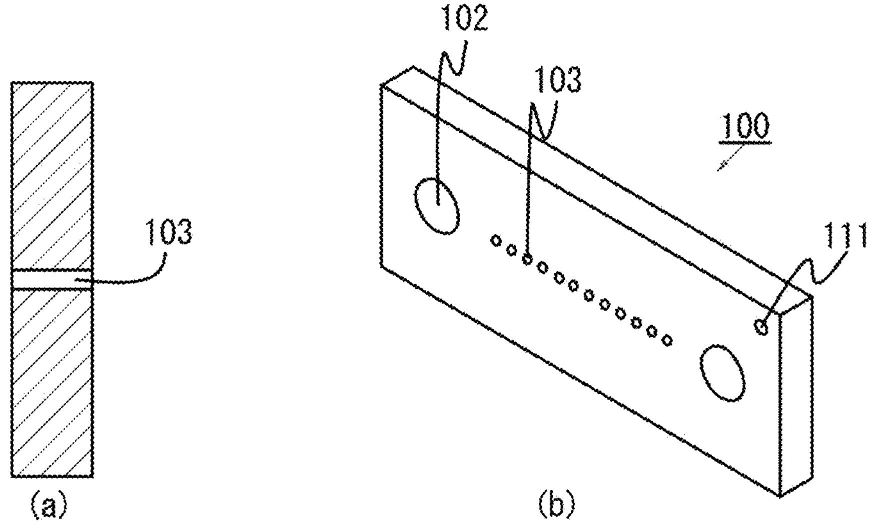

[Fig15]
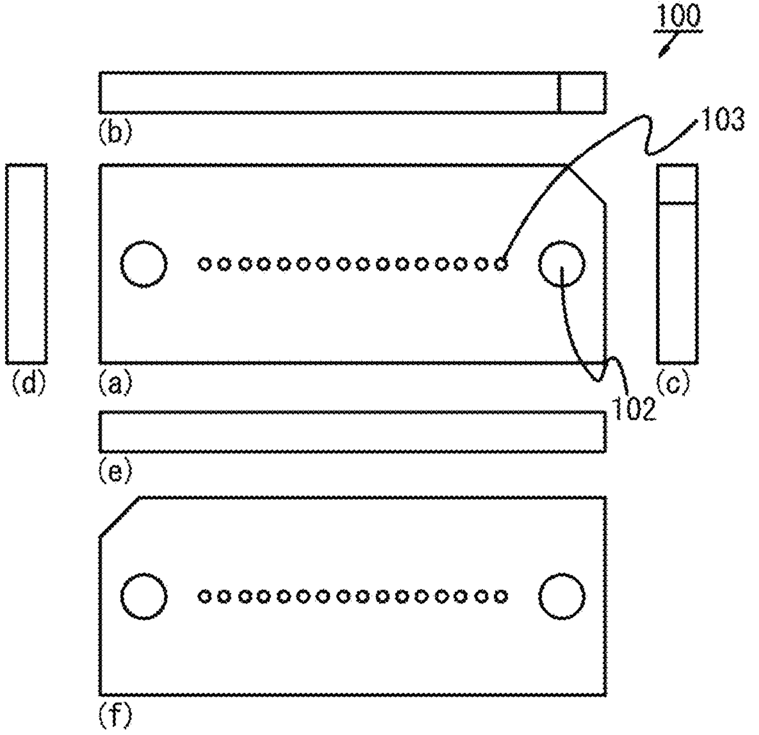
[Fig16]
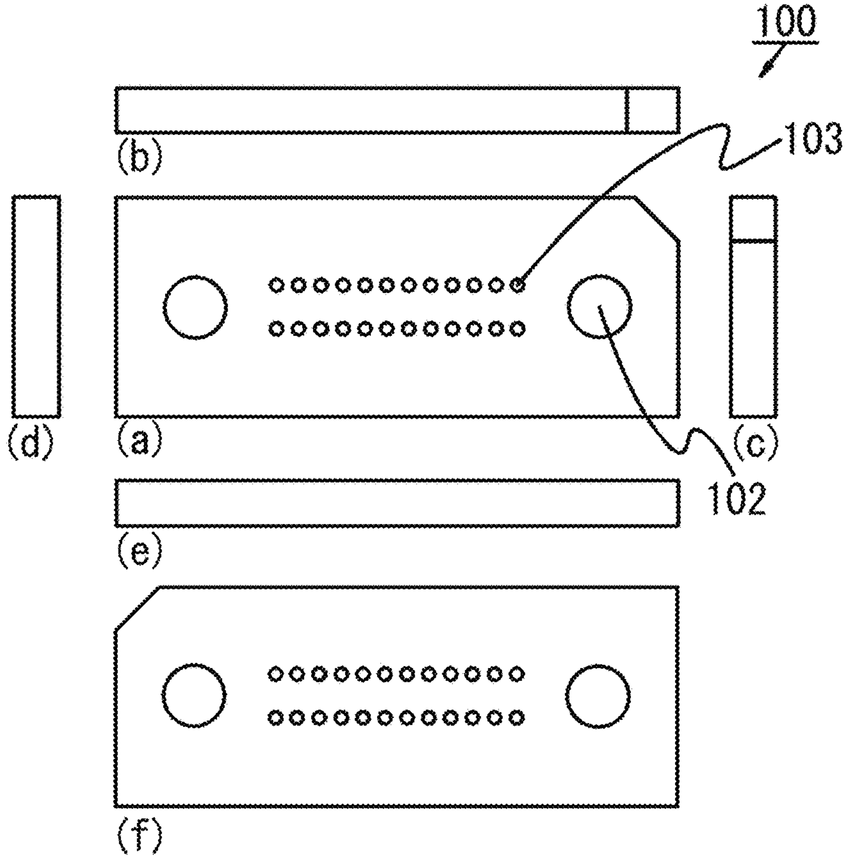

[Fig17]
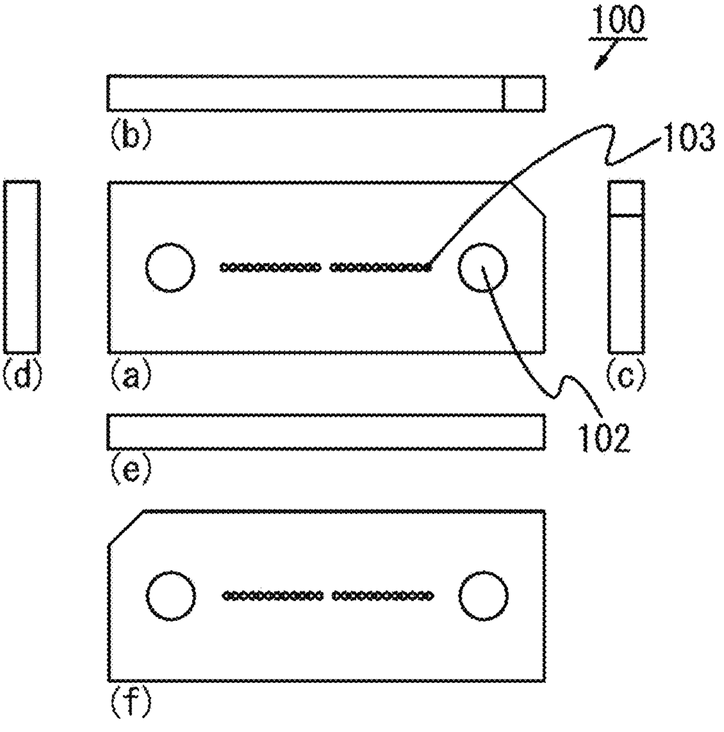
[Fig18]
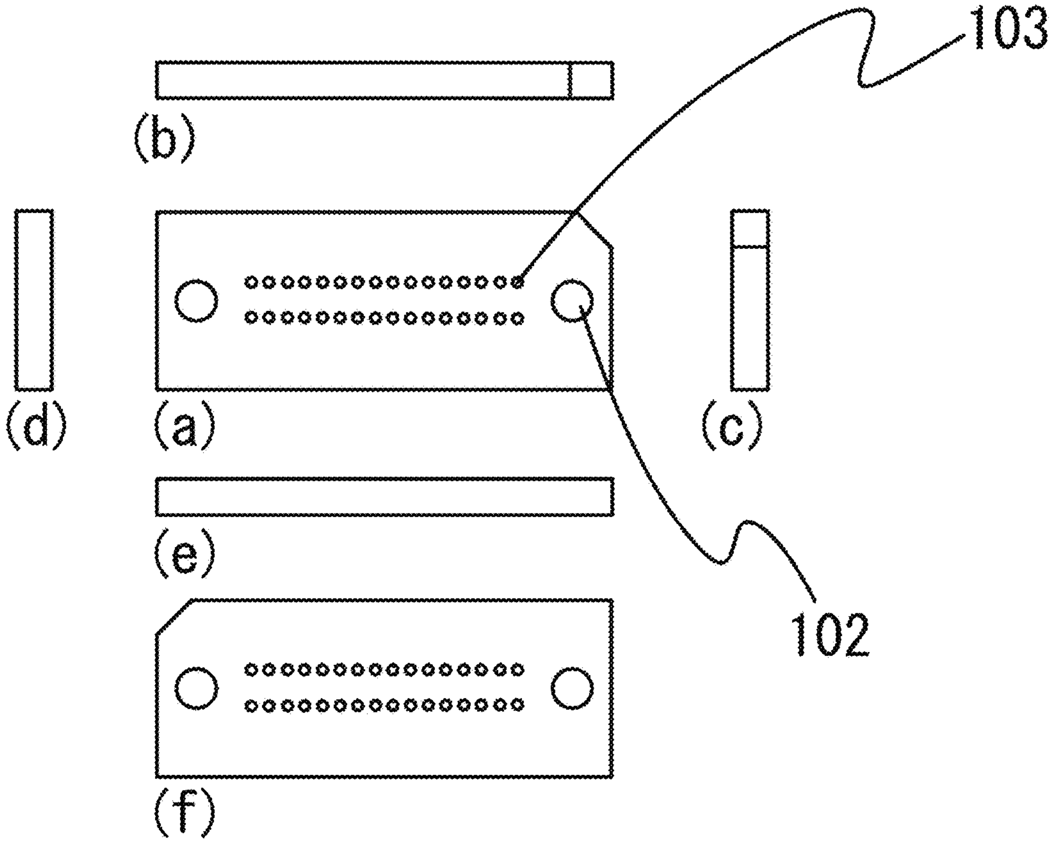

[Fig19]
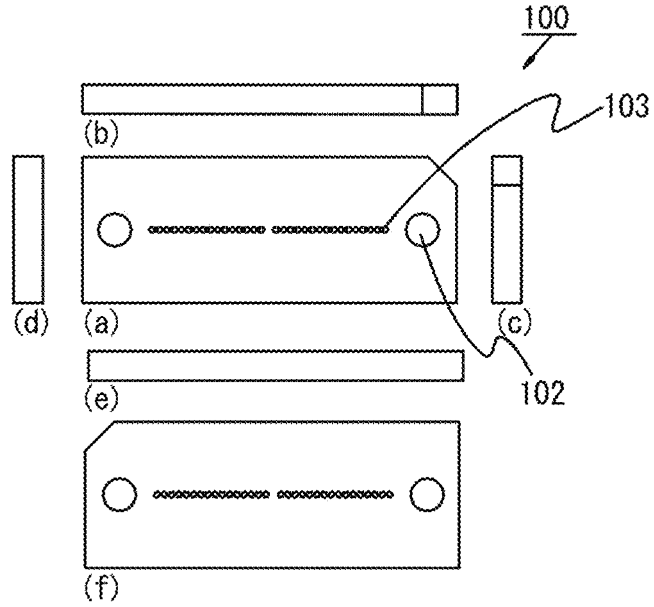
[Fig20]
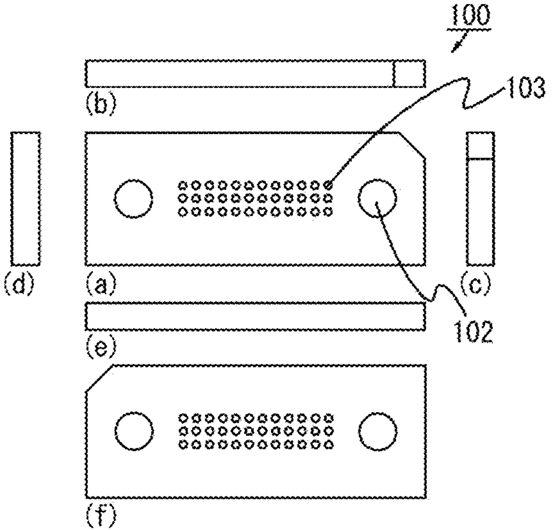
[Fig21]
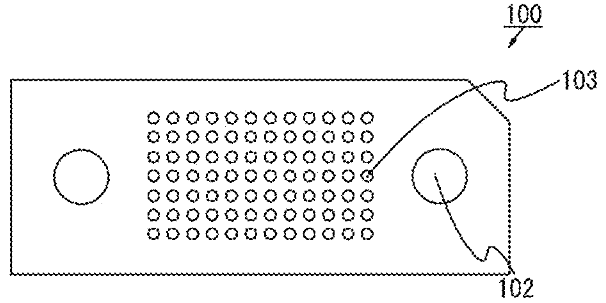

[Fig22]
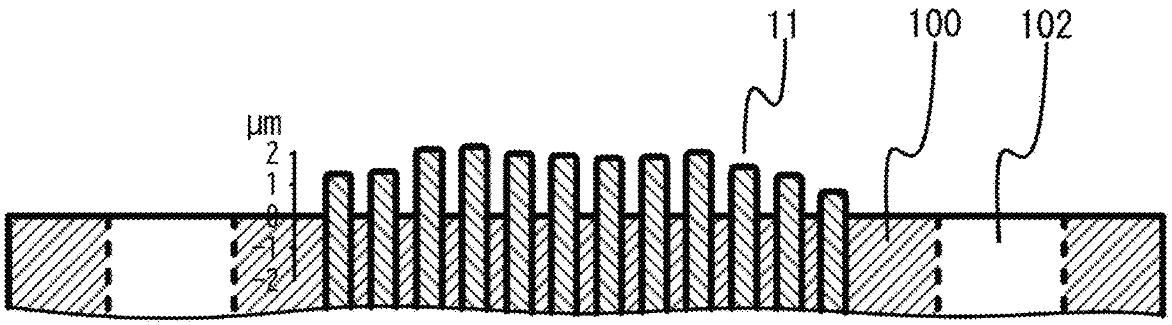
[Fig23]
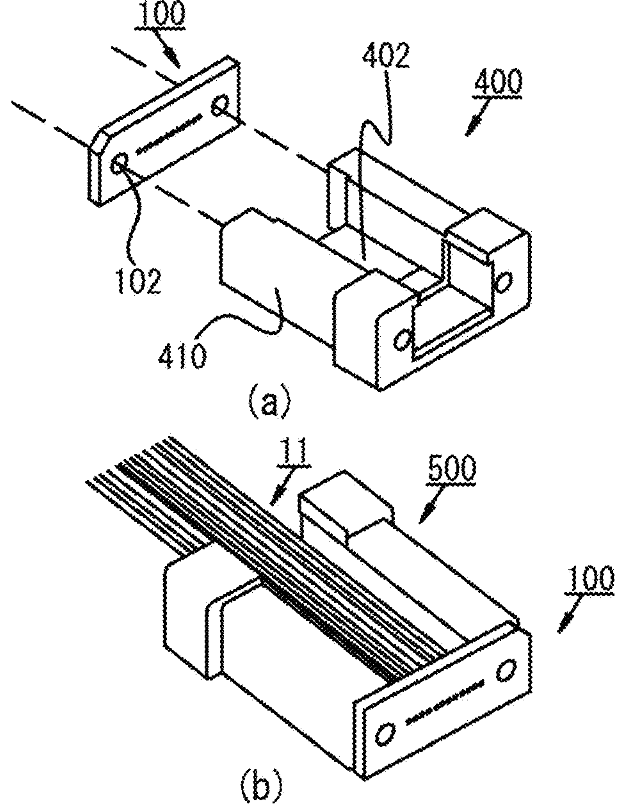

[Fig24]
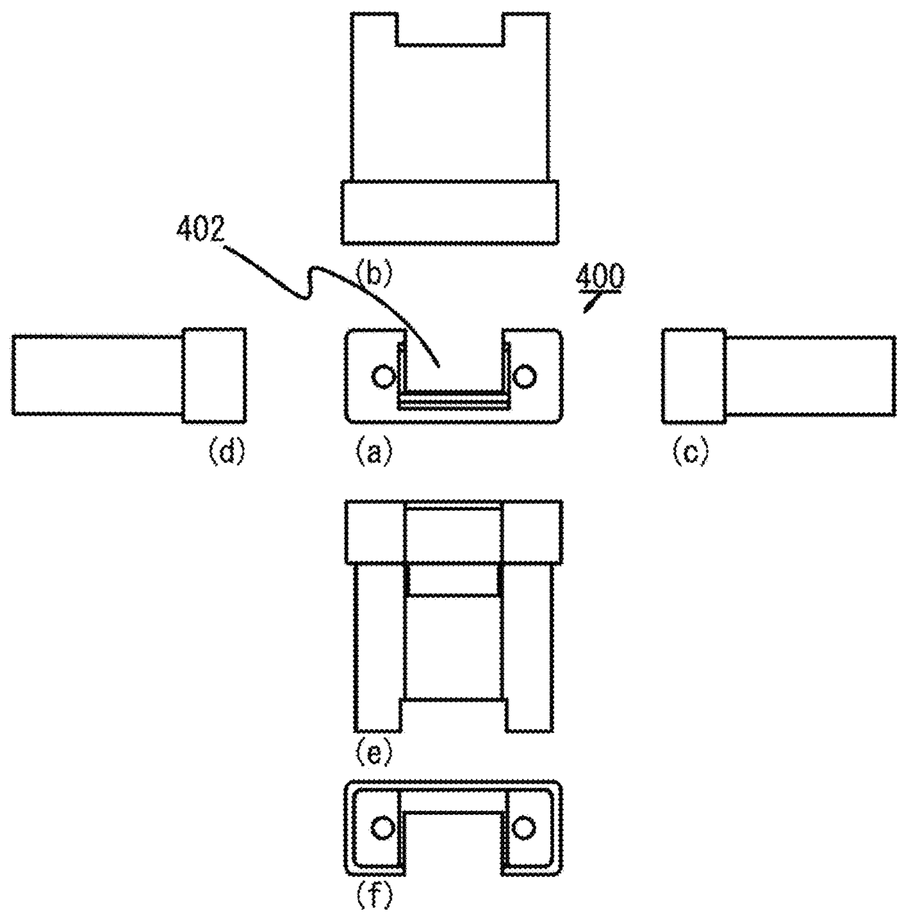
[Fig25]
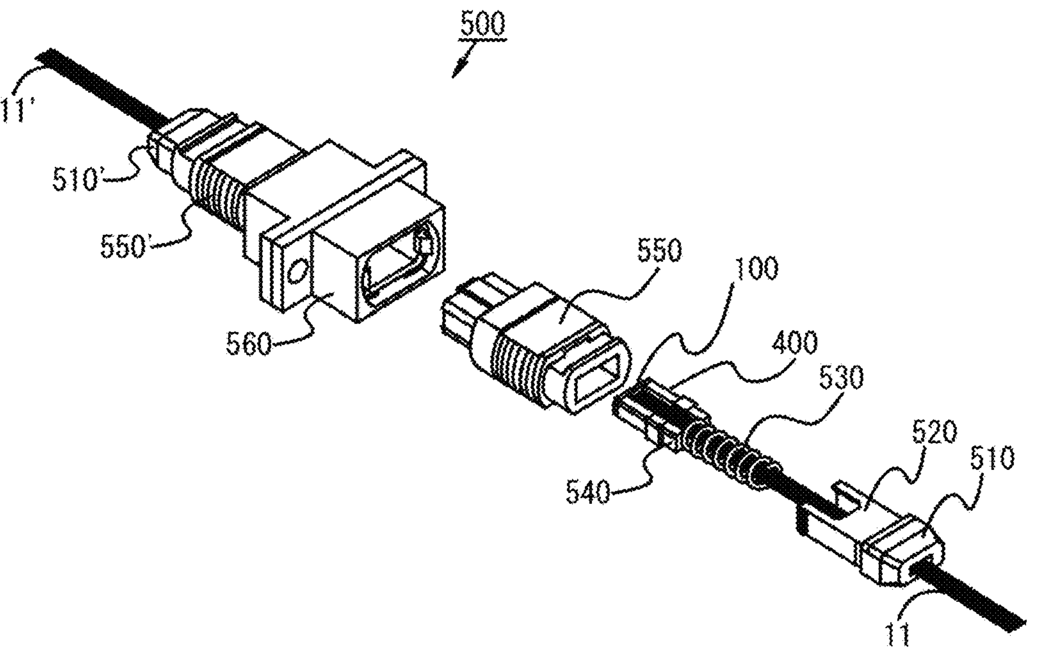

[Fig26]
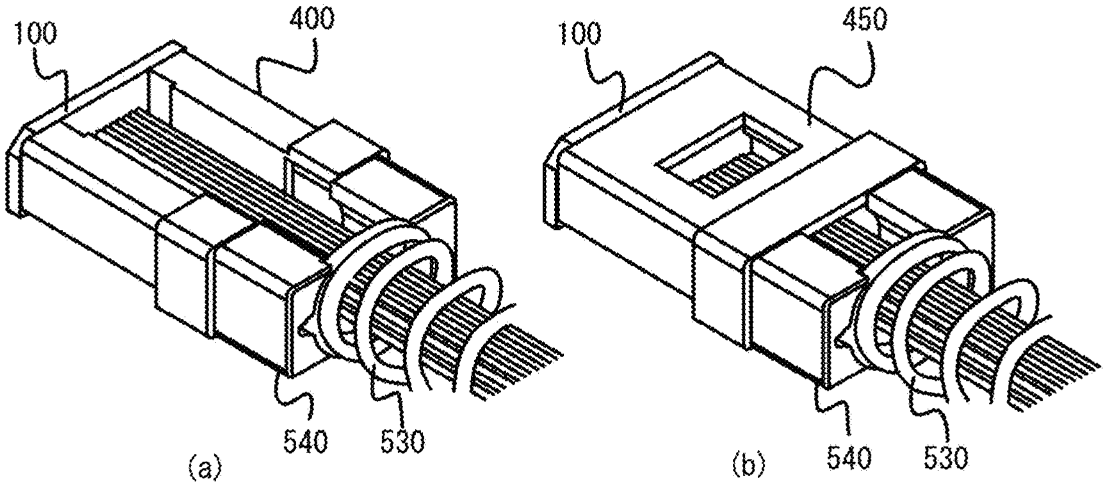
[Fig27]
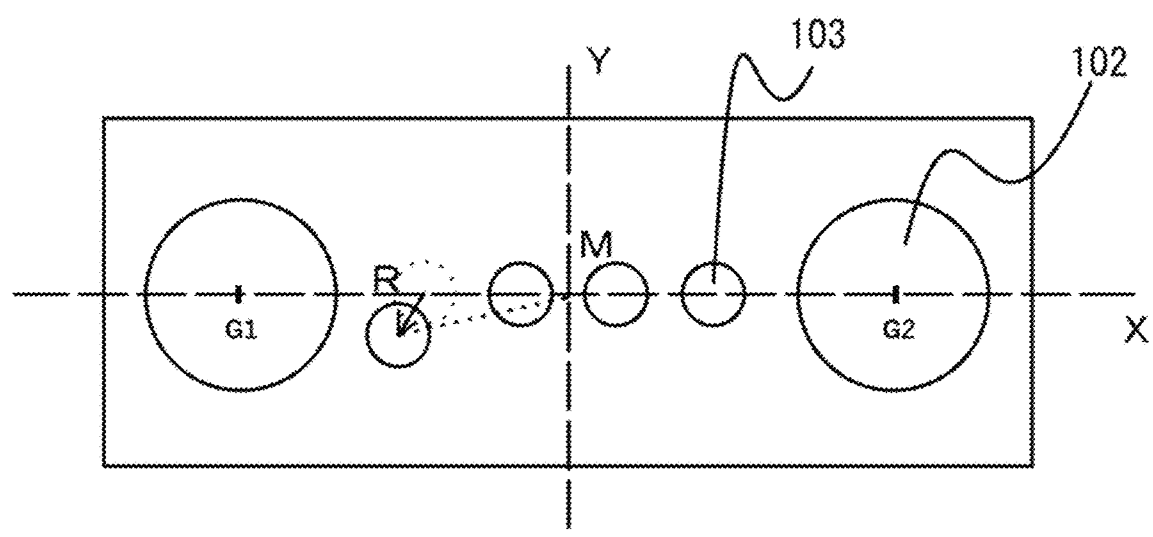

OPTICAL FIBER ASSEMBLY, PLATE, AND OPTICAL MODULE

TECHNICAL FIELD

The present invention relates to an optical fiber assembly used for mechanically connecting optical fibers to each other without causing connection loss, and a plate used for the optical fiber assembly.

BACKGROUND ART

In optical communication, optical connectors are used for mechanically connecting optical fibers.

In particular, MT connectors (Mechanically Transferable connectors) developed for optical network devices are multi-fiber optical connectors that have reliability and have been widely put into practical use mainly for optical communication networks. The MT connector detachably connects a pair of optical connectors using guide pins, and is used for, for example, connection of 2- to 16-core optical fiber tape core wires, optical fiber cords or the like. Not only the MT connector but also a configuration achieved as an MPO connector that stores an optical ferrule in a housing, and includes guide pins, a latch mechanism or the like has been known.

For example, Patent Literature 1 (Japanese Patent Laid-Open No. 2002-350680) discloses an optical ferrule that allows physical contact between optical fibers.

The optical ferrule described in Patent Literature 1 is an injection-molded object made of a resin composition containing 100 mass parts of polyphenylene sulfide resin, into which 100 to 300 mass parts of silica having a maximum particle diameter no more than 100 μm, and 50 to 300 mass parts of barium titanate are mixed.

Patent Literature 2 (Japanese Patent Laid-Open No. 2001-174666) discloses an optical ferrule that allows physical contact between optical fibers.

The optical ferrule described in Patent Literature 2 is a molding of a resin composition that contains, as essential constituents, a base resin, silica, and whisker. The resin composition has a melt viscosity of 300 to 600 [Pa·sec] when measured at a shear rate of 900 [1/sec] at a temperature of 340° C. by using a capillary having a diameter of 0.1 mm and a depth of 30 mm, as defined by JIS-K-7199. Preferably, the optical ferrule is an injection-molded object made of a resin composition that contains linear polyphenylene sulfide resin as the base resin, and further contains 250 to 300 weight parts of silica, and 10 to 70 weight parts of whisker, relative to 100 weight parts of the linear polyphenylene sulfide resin.

Patent Literature 3 (Japanese Patent Laid-Open No. 2004-29415) discloses an optical connector including a ferrule that can maintain the dimensional accuracy and the dimensional stability, and further improve the mechanical strength.

The optical connector described in Patent Literature 3 is an optical connector that has optical fiber holes and guide holes, and allows guide pins to be inserted into the guide holes to position connection of optical fibers, and includes a ferrule molded from a resin composition containing 10 to 20 weight percent of polyphenylene sulfide resin, and 80 to 90 weight percent of silica particles.

Patent Literature 4 (Japanese Patent Laid-Open No. 2003-185886) discloses an optical connector that is made of a PPS resin composition containing inorganic filler made up of silica particles, includes an optical connector ferrule fabricated by injection molding, substantially prevents silica from dropping even when the optical connector is repetitively attached and detached, and prevents any scar affecting the property of the optical connector from being formed on end faces of optical fibers.

The optical connector described in Patent Literature 4 includes the optical connector ferrule that has at least one optical fiber insertion hole, and two fitting holes for allowing fitting pins for connecting optical connectors to be inserted. The optical connector ferrule is formed of a PPS resin composition that contains fibrous filler and silica particles surface-treated with a vinyl-based silane coupling agent.

Patent Literature 5 (Japanese Patent Laid-Open No. 2003-138044) discloses a molded object that is excellent in injection molding property without loss of melt fluidity of a resin composition, is excellent in mechanical strength of the molded object, has a small connection loss even after being repetitively attached and detached, and is suitable for an optical connector ferrule or the like.

The molded object described in Patent Literature 5 is made by melt-molding a PPS resin composition and irradiating the molded object with ionizing radiation, the PPS resin composition containing (A) a PPS resin where specific functions X are introduced to ends of molecules or side chains, and (B) a fused mixture of organic compounds containing, in the same molecule, a carbon-carbon double bond, a function X introduced to the PPS resin, and a group of atoms capable of forming a chemical bond when being fused and mixed, and further containing (C) inorganic filler surface-treated with a silane coupling agent having a carbon-carbon double bond, or a silane coupling agent having a carbon-carbon double bond and inorganic filler.

Patent Literature 6 (Japanese Patent Laid-Open No. 2014-240958) discloses an optical module that allows surface mounting by a reflow furnace, and emits laser light without optical fibers being extended to the outside of a mounting substrate.

The optical module described in Patent Literature 6 includes: a plurality of photonic elements that emit colors, or red, green, and blue, of laser beams; a plurality of optical fibers that guide the color laser beams from the respective photonic elements; a mounting substrate that includes an upper surface mounted with the plurality of photonic elements, and a through electrode formed from the upper surface to the bottom surface as an electrode for supplying electric signals to the plurality of photonic elements; and a multiplexer that is disposed at a corner of the mounting substrate, and bundles and fixes emission ends of the optical fibers, thus emitting multiplexed light where the color laser beams are multiplexed.

CITATION LIST

Patent Literature

Patent Literature 1: Japanese Patent Laid-Open No. 2002-350680

Patent Literature 2: Japanese Patent Laid-Open No. 2001-174666

Patent Literature 3: Japanese Patent Laid-Open No. 2004-29415

Patent Literature 4: Japanese Patent Laid-Open No. 2003-185886

Patent Literature 5: Japanese Patent Laid-Open No. 2003-138044

Patent Literature 6: Japanese Patent Laid-Open No. 2014-240958

SUMMARY OF INVENTION

Technical Problem

A ferrule is a main component included in a multi-fiber optical connector, and is formed by molding a synthetic resin with a mold.

The ferrule is provided with insertion holes allowing optical fiber tape to be inserted therein, and is provided with a plurality of optical fiber holes allowing optical fibers from which coating has been removed to be arranged, the optical fiber holes communicating with the optical fiber tape insertion holes. Furthermore, guide holes for positioning and connecting optical connectors to each other are provided in parallel with the optical fiber holes in a penetrating manner. The optical fiber tape, with coating at a distal end portion being removed, is inserted from the rear of the ferrule, and the plurality of exposed optical fibers are inserted into the respective optical fiber holes in the ferrule and are fixed with an adhesive. After the optical fibers are inserted into the ferrule, connection end faces of the optical fibers are polished together with a connection end face of the ferrule.

Guide pins are preliminarily inserted into the respective guide holes of one ferrule included in the multi-fiber optical connector, and fixed therein, the guide pins are inserted into the respective guide holes of the other ferrule, and the contact faces of the optical connectors are brought into contact with each other, thus achieving collective connection of the optical fibers.

Such ferrules of the optical connectors are required to highly accurately position the axes of the optical fibers to each other. For achieving the positioning, the ferrules require properties, such as the dimensional stability and mechanical strength.

Conventionally, it has been known that polyphenylene sulfide, which has a small shrinkage ratio during molding, is excellent in the dimensional stability over time, and is excellent in high fluidity and environment resistance during molding, is used as a ferrule molding material.

Polyphenylene sulfide (PPS) has a low melt viscosity, and allows a large amount of filler to be mixed. Accordingly, ferrules that have a small mold shrinkage ratio, and a high dimensional accuracy can be achieved.

The diameters and pitches of guide holes and fiber insertion holes of the ferrules require a sub-micrometer order of accuracy. For example, it is said that the fiber insertion holes having an axial deviation of 1 μm causes a connection loss of about 0.2 dB. Accordingly, molding is performed in consideration of curing and contraction of the ferrule after molding. However, the cure shrinkage ratio of the molding material largely varies. It is thus very difficult to mold the ferrule at a high dimensional accuracy.

Furthermore, possible temperature change after molding of the ferrule expands or shrinks the ferrule, and dimensional deformation occurs. As a result, there is a problem that the positions of the optical fibers fixed to the ferrule are changed, and the connection loss increases.

Accordingly, as described in Patent Literatures 1 to 5, ferrules excellent in dimensional accuracy and dimensional stability have been developed.

On the other hand, as described in Patent Literature 6, in recent years, an optical module where photonic elements are mounted on a substrate, and the photonic elements and optical fibers are optically connected to each other has been developed. Thus, an optical mounting circuit where high-speed and high-density optical communication is directly introduced on an electronic board (or to the vicinity of the electronic board), and no electric wiring intervenes has been discussed.

However, there occurs a problem that with the optical module that connects the photoelectric conversion element mounted on the substrate to the ferrule to which optical fibers are connected, if the optical connector provided with the ferrule made of a resin is mounted on the substrate and is then subjected to reflow soldering, heating by the reflow soldering process changes the dimensions of the ferrule. As a result, the optical fibers are misaligned, which worsens the connection loss.

The temperatures of some components among the electronic components on the substrate become high due to operation. The optical connector is sometimes subjected to temperature change having not conventionally occurred. This change also causes misalignment in some cases, thus worsening the connection loss.

In particular, the optical mounting circuit requires a ferrule that does not misalign optical fibers even when a high-density optical connector is mounted accompanied by increase in speed and capacity, and has low connection loss.

Furthermore, the techniques described in the Patent Literatures described above require that a plurality of optical fiber insertion holes are fabricated highly accurately in units of micrometers at a distal end of the ferrule so as to support the number of multi-fiber optical fibers. Accordingly, an accurate mold for forming the plurality of optical fiber insertion holes at the distal end of the ferrule is required, and the manufacturing cost cannot be reduced. In particular, due to the problem of the accuracy of pins of the mold for forming the fiber insertion holes, increase in the number of holes makes this issue significant.

Meanwhile, in recent years, high-speed and large-capacity communication has been required, and increase in density at the connector of optical fibers also has been discussed. However, it has been difficult to highly accurately mold a complicated shape with a high density for a ferrule resin-molded using a mold.

Ferrules and optical connectors in conformity with existing standards have been used to connect optical fibers to each other in a case of connection of optical devices at long distances. Accordingly, to connect optical fibers in a narrow space, such as of the inside of a computer, and achieve substrate implementation, significantly small components are required, and the design is required to be completely changed.

The present invention has been made to solve the drawbacks described above, and has an object to provide an optical fiber assembly, a plate, and an optical module that can reliably connect optical fibers even in a narrow space and achieve substrate implementation, and have low connection loss.

The present invention has another object to provide an optical fiber assembly, a plate, and an optical module that do not adversely affect the connection loss even in case of exposure to a high temperature, such as in mounting of an optical connector on a substrate and reflow soldering.

The present invention has still another object to provide an optical fiber assembly, a plate, and an optical module that can form a precise and complicated shape without the need of mold forming.

The present invention has yet another object to provide an optical fiber assembly, a plate, and an optical module that can achieve direct optical connection by physical contact even in an environment where a refractive index matching agent or an optical lens cannot be used.

Solution to Problem (1)

An optical fiber assembly according to one aspect includes: a plate-like ferrule that is formed of ceramics, and has optical fiber insertion holes and guide holes for insertion of a guide pin; and an optical fiber inserted into the optical fiber insertion holes of the ferrule, wherein the optical fibers are fixed to the optical fiber insertion holes of the ferrule with an adhesive filled in the optical fiber insertion holes.

Accordingly using the ceramics as the material of the plate, a heat-resistant optical connection component can be designed. Unlike manufacturing of a ferrule using a conventional resin, use of the plate made of plate-like ceramics as the ferrule negates the need to design a runner portion that is a passage of a material required for injection molding. Consequently, a ferrule having a thickness no more than 2.5 mm can also be manufactured; it is difficult to achieve the accuracy of such a ferrule according to a conventional design.

Conventional resin molding using a mold is not required, and a plate made of ceramics having a high mechanical strength and heat resistance is machined. Accordingly, a complicated and fine shape can be highly accurately formed. Consequently, the number of optical fibers can be increased in comparison with that in the conventional cases, high-density optical connection can be achieved, and connection of high-speed and large-capacity communication can be achieved.

In this case, a preferable example of ceramics is machinable ceramics. Use of the machinable ceramics allows fine and precise processing.

Furthermore, in a case where the ferrule is mounted on the substrate and subjected to reflow soldering, the dimensions hardly change due to heat even if the ferrule is subjected to a high temperature by the temperature of the reflow soldering process. As a result, the optical fibers are prevented from being misaligned, and the connection loss is not worsened. That is, the property, such as connection loss, do not vary before and after the reflow soldering process, and the property does not vary even with arrangement adjacent to a component that reaches a high temperature. Furthermore, in recent years, optical communication using a high-power laser has been discussed; even when an optical connection portion produces heat, the ferrule is not damaged, and the property, such as connection loss, does not vary.

Moreover, unlike conventional manufacturing using PPS resin that is super engineering plastic with an injection molding mold, the heat-resistant ferrule can be manufactured relatively inexpensively.

The ceramic ferrule has a thermal expansion coefficient close to that of a photoelectric conversion element or a silicon optical waveguide. Accordingly, the expansion and contraction due to heat are similar to those of the photoelectric conversion element or the silicon optical waveguide mounted on the substrate, and the reliability can be improved. In selection of a material of machinable ceramics, it is more preferable to select a material having a physical property, such as linear expansion coefficient, similar to that of the photoelectric conversion element or the silicon optical waveguide.

Furthermore, by configuring the ferrule to have a plate shape, connection with a small size and a low height can be achieved, and optical fibers can be reliably connected even in a narrow space, which can achieve optical implementation on the substrate.

(2)

The optical fiber assembly according to a second invention is the optical fiber assembly according to the first invention wherein the ceramics may include machinable ceramics, and the optical fiber may contain quartz glass.

Consequently, at the connection end face of the ceramic plate to which the optical fibers are fixed, and the core portions of the optical fibers are made of quartz glass, and the plate main body portion is made of machinable ceramics.

In this case, the optical fibers have a higher hardness than the plate main body. Accordingly, after the connection end face of the plate is optically polished for optical connection, the connection end faces of the optical fibers slightly protrude to have convex shapes from the connection end face of the plate main body.

Consequently, when the optical fiber assembly is optically connected, the convex shapes of the optical fibers come into contact with each other and are deformed, which can achieve physical contact (PC) connection. Since Fresnel reflection is thus suppressed, the amount of signal reduction can be reduced.

Consequently, a refractive index matching agent, an optical lens or the like is not required to be used at the connection end of the connector, and an optical signal can be connected with a low loss.

Note that it is appropriately selected whether a refractive index matching agent, an optical lens or the like is used at the connection end face or not according to the purpose of optical connection or the like. The connection method is not limited to PC connection.

(3)

The optical fiber assembly according to a third invention is the optical fiber assembly according to the first or second invention, wherein the ceramics may have a hardness lower than a hardness of the optical fiber.

Accordingly, the core portions of the optical fibers have a higher hardness than the plate main body portion. Accordingly, after the connection end face of the plate is optically polished for optical connection, the connection end faces of the optical fibers protrude to have convex shapes from the connection end face of the plate main body.

Consequently, when the optical fiber assembly is optically connected, the convex shapes of the optical fibers come into contact with each other and are deformed, thus achieving physical contact (PC) connection. Since Fresnel reflection is thus suppressed, the amount of signal reduction can be reduced.

Consequently, a refractive index matching agent, an optical lens or the like is not required to be used at the connection end of the connector, and an optical signal can be connected with a low loss.

The hardness in the present invention is a Vickers hardness (GPa) measured by JIS Z2244.

(4)

The optical fiber assembly according to a fourth invention is the optical fiber assembly according to any of the first to third inventions, wherein the ferrule may be a multi-fiber optical connector ferrule that has at least 12 optical fiber insertion holes.

Unlike the conventional resin molding using a mold, a plate of ceramics having high heat resistance can be machined, which can highly accurately form a complicated and fine shape. Consequently, the number of optical fibers can be increased in comparison with that in the conventional cases, high-density optical connection can be achieved, and connection of high-speed and large-capacity communication can be achieved.

The number of connections of the multi-fiber optical connector may be 12, or be 16, 24, 32, 36, 48 or the like, for example. In a case of a large number of connections, a configuration may be adopted where the optical fiber insertion holes are arranged in two or three rows. In this case, it is preferable that the ceramics should be machinable ceramics having a low hardness to facilitate fine and precise processing at low cost.

(5)

The optical fiber assembly according to a fifth invention is the optical fiber assembly according to any of the first to fourth inventions, wherein an amount of dimensional variation of the ferrule heated at 260° C. may be no more than 0.5 μm.

Accordingly, in a case where the optical connector is mounted on the substrate and subjected to reflow soldering, the ferrule hardly changes in dimension even if the ferrule is subjected to a high temperature due to the temperature of the reflow soldering process. As a result, the optical fibers are prevented from being misaligned, which can prevent adverse effects, such as of connection loss. Consequently, the property, such as connection loss, is unchanged before and after the reflow soldering process. Furthermore, even when the electronic components on the substrate are subjected to temperature change due to operation, the property, such as connection loss, is unchanged. Consequently, even in a case where the optical wiring is implemented on the substrate, the optical fiber assembly having low connection loss can be achieved.

Note that the amount of dimensional variation according to the present invention is the average value of the amounts of positional variation R of the fiber insertion holes in comparison before the heating test and after the heating test with reference to the midpoint M of the perpendicular bisector connecting the center points G1 and G2 of the guide holes (see FIG. 27).

(6)

The optical fiber assembly according to a sixth invention is the optical fiber assembly according to any of the first to fifth inventions, wherein the ferrule may include a plate main body formed to have a rectangular shape, and a surface identification structure may be formed at one corner of the plate main body.

It is confirmed that one surface (assumed as an A surface) and the other surface (assumed as a B surface) of the plate main body are not strictly identical to each other, in terms of the forms of the optical fiber insertion holes (the inclination angles of the holes from the surface of the plate main body, the internal diameters of the holes and the like). Accordingly, the connection loss values on both the surfaces of the plate main body are not identical to each other, and are slightly different from each other. That is, since the machining process to the plate main body is cutting on one surface by a drill or the like, the shapes of the optical fiber insertion holes are not strictly symmetrical on both the surfaces. Accordingly, by forming the surface identification structure at one corner of the plate main body, the A surface and the B surface of the plate main body can be easily, visually discriminated from each other with reference to the surface identification structure.

Note that as for the surface identification structure, a method of providing a beveled part (assumed as a C surface), or providing an identification through-hole is used.

(7)

The optical fiber assembly according to a seventh invention is the optical fiber assembly according to any of the first to sixth inventions, wherein the plate main body (ferrule) may include a thin portion where the plate main body formed to have the optical fiber insertion holes has a small thickness, and a thick portion, and guide grooves that communicates with the optical fiber insertion holes may be formed in an upper end face of the thick portion.

Accordingly, when the optical fibers are inserted into the respective optical fiber insertion holes, the distal ends of the optical fibers can be inserted along the guide grooves that have concave shapes and formed in the upper end face of the thick portion and guided to the optical fiber insertion holes. Thus, the optical fiber assembly can be easily assembled.

The optical fibers are fine lines of several tens to one hundred and several tens of micrometers, and are required to be inserted into the insertion holes having a size substantially identical to the diameter of each optical fiber. Accordingly, fine and difficult operations are required to assemble the optical fiber assembly. In particular, optical implementation on the substrate requires high-speed and large-capacity communication. Accordingly, multi-fiber optical fibers are often used, and several tens of optical fibers are required to be inserted into a single plate in some cases. The optical fiber assembly according to the seventh invention can easily perform assembly even in a case of using multi-fiber optical fibers.

(8)

The optical fiber assembly according to an eighth invention is the optical fiber assembly according to the seventh invention, wherein at least two rows of the optical fiber insertion holes may be arranged, the thin portion may have at least two thicknesses, and the guide grooves may be provided stepwise on each row of the optical fiber insertion holes.

Accordingly, the optical fibers are inserted while being along the guide grooves that have stepwise concave shapes. Consequently, even in a case where the number of optical fiber insertion holes is large and high-density optical connection is performed, the optical fibers can be easily inserted into the optical fiber insertion holes provided in a plate with small dimensions.

In comparison with a flat plate, the adhesive accumulates sufficiently in the step portion. Accordingly, a sufficient amount of adhesive is applied into the optical fiber insertion holes when the optical fibers are inserted.

(9)

The optical fiber assembly according to a ninth invention is the optical fiber assembly according to any of the first to eighth inventions, wherein an adhesive reservoir including the optical fiber insertion holes may be provided in a surface of the plate main body (ferrule) in a concave manner.

Accordingly, the excess amount of adhesive besides use to fix the optical fibers to the optical fiber insertion holes accumulates in the adhesive reservoir, which prevents cured excess adhesive from protruding beyond the surface of the ceramic plate. In particular, the surface shape of the cured adhesive is not completely flat. Accordingly, uneven gaps sometimes occur due to the cured adhesive.

The optical assembly according to the ninth invention allows the adhesive to be stored in the adhesive reservoir having a concave shape. Accordingly, the end face of the plate can be kept flat. Even in a case where the ceramic plate is fixed to the contact face of a jig or the optical connector, such as the MT ferrule, in an abutting manner, a failure hardly occurs. Consequently, the optical fiber assembly as designed can be highly accurately manufactured, and the connection loss is not increased.

(10)

The optical fiber assembly according to a tenth invention is the optical fiber assembly according to any of the first to ninth inventions, wherein the guide hole may be formed to have a hat-shaped cross section, and have a small hole, and a large hole formed around the small hole.

Accordingly, use of the guide pins having flanges in conformity with the hat shapes can connect the end face of the ceramic plate to the optical connector, such as the MT ferrule. The optical fiber assembly according to the tenth invention allows bolt-shaped guide pins to be inserted from the ceramic plate side, which can fix the guide pins while suppressing the amount of protrusion of the guide pins.

In particular, in a case where the ceramic plate is connected so as to be fitted to the MT ferrule or the like, use of the guide pins having flanges allows the entire surface of the ceramic plate on the fiber insertion side to be used without being affected by the guide pins.

(11)

The optical fiber assembly according to an eleventh invention is the optical fiber assembly according to any of the first to tenth inventions, wherein the plate main body may have a thickness ranging from 0.3 to 3.0 mm, inclusive.

Accordingly, polishing can be performed without breaking the plate main body. Furthermore, the guide grooves for the optical fibers, the adhesive reservoir and the like can be formed without any trouble.

If the thickness of the plate main body is less than the range described above, for example, the thickness of the thin portion becomes too small when the guide grooves are formed in the plate, and the plate is sometimes broken. Furthermore, the guide grooves having an appropriate length cannot be provided in some cases. When the plate end face is polished after the optical fibers are bonded and fixed to the plate, the polishing is performed in a state where the plate is attached to a jig. However, the plate is possibly broken by a pressing force for polishing the end face.

(12)

An optical module according to a twelfth invention includes: a substrate; a photoelectric conversion element mounted on the substrate; and the optical fiber assembly according to any of the first to eleventh inventions that is mounted close to the photoelectric conversion element or a silicon optical waveguide, and optically connected.

The ceramic plate is excellent in heat resistance. Accordingly, even when the optical fiber assembly and the photoelectric conversion element are mounted on the substrate and are subjected to reflow soldering, no dimensional variation due to heat occurs, and the property, such as connection loss, does not vary. The ceramic plate can be configured to have a thermal expansion coefficient similar to that of the photoelectric conversion element or the silicon optical waveguide. Accordingly, the dimensional variation is small, thus allowing the light loss to be reduced. Even at a position close to the electronic component at a high temperature, high-density optical lines can be implemented, and high-speed and large-capacity information processing can be performed. The photoelectric conversion element may be a vertical cavity surface emitting laser (VCSEL: Vertical Cavity Surface Emitting LASER), a laser diode (LD), a photodetector (PD) or the like. In selection of a material of machinable ceramics, it is more preferable to select a material having a physical property, such as linear expansion coefficient, similar to that of silicon.

(13)

A plate according to a thirteenth invention is a plate made of ceramics, the plate having: a plurality of optical fiber insertion holes; and guide holes for guide pin insertion, wherein the plate has a hardness of no more than 8.0 GPa.

Since the ceramics is used as the material of the plate, a heat-resistant optical connection component can be designed. Unlike manufacturing of a ferrule using a conventional resin, use of the ceramic plate as the ferrule negates the need to design a runner portion that is a passage of a material required for injection molding. Consequently, a ferrule having a thickness no more than 2.5 mm can also be manufactured, which is difficult to achieve the accuracy of such a ferrule according to a conventional design.

Conventional resin molding using a mold is not required, and a plate made of ceramics having a high mechanical strength and heat resistance is machined. Accordingly, a complicated and fine shape can be highly accurately formed. Consequently, the number of optical fibers can be increased in comparison with that in the conventional cases, high-density optical connection can be achieved, and connection of high-speed and large-capacity communication can be achieved.

In this case, a preferable example of ceramics is machinable ceramics. By adopting the machinable ceramics, fine and precise processing with a low hardness can be performed easily at low cost.

Furthermore, in a case where the ferrule is mounted on the substrate and subjected to reflow soldering, the dimensions hardly change due to heat even if the ferrule is subjected to a high temperature from the temperature of the reflow soldering process. As a result, the optical fibers are prevented from being misaligned, and the connection loss is not worsened. That is, the property, such as connection loss, do not vary before and after the reflow soldering process, and the property does not vary even with arrangement adjacent to a component that reaches a high temperature. Furthermore, in recent years, optical communication using a high-power laser has been discussed; even when an optical connection portion produces heat, the property, such as connection loss, does not vary.

Moreover, unlike conventional manufacturing using PPS resin that is super engineering plastic with an injection molding mold, the heat-resistant ferrule can be manufactured relatively inexpensively.

The ceramic ferrule has a thermal expansion coefficient close to that of the photoelectric conversion element or the silicon optical waveguide. Accordingly, the expansion and contraction due to heat are similar to those of the photoelectric conversion element or the silicon optical waveguide mounted on the substrate, and the reliability can be improved. In selection of a material of machinable ceramics, it is more preferable to select a material having a physical property, such as linear expansion coefficient, similar to that of the photoelectric conversion element or the silicon optical waveguide.

Furthermore, by configuring the ferrule to have a plate shape, connection with a small size and a low height can be achieved, and optical fibers can be reliably connected even in a narrow space, which can achieve optical implementation on the substrate.

Furthermore, since the plate has a hardness of no more than 8.0 GPa, quartz fibers typically used for optical communication have a higher hardness than the plate. Consequently, after the connection end face of the plate is optically polished for optical connection, the connection end faces of the optical fibers protrude to have convex shapes from the connection end face of the plate main body.

Consequently, when the optical fiber assembly is optically connected, the convex shapes of the optical fibers come into contact with each other and are deformed, thus achieving physical contact (PC) connection. Since Fresnel reflection is thus suppressed, the amount of signal reduction can be significantly reduced. Consequently, a refractive index matching agent, an optical lens or the like is not required to be used at the connection end of the connector, and an optical signal can be connected with a low loss.

The hardness in the present invention is a Vickers hardness (GPa) measured by JIS Z2244. It is appropriately selected whether a refractive index matching agent, an optical lens or the like is used at the connection end face or not according to the purpose of optical connection or the like. The connection method is not limited to PC connection.

Furthermore, unlike the conventional ferrule production, no injection molding mold is used. Accordingly, the plate for the heat-resistant ferrule can be manufactured at relatively low cost.

The ceramic plate has a thermal expansion coefficient close to that of silicon. Accordingly, the expansion and contraction due to heat is similar to that of the silicon optical waveguide, lenses, other optical elements and the like mounted on the substrate, and the reliability can be improved.

Furthermore, by adopting a plate shape, connection with a small size and a low height can be achieved, and optical fibers can be reliably connected even in a narrow space, which can achieve optical implementation on the substrate. Note that in selection of a material of machinable ceramics, it is more preferable to select a material having a physical property, such as linear expansion coefficient, similar to that of silicon.

(14)

The plate according a fourteenth invention is the plate according to the thirteenth invention, wherein the number of optical fiber insertion holes may be at least 12.

Unlike the conventional resin molding using a mold, a plate of ceramics having high heat resistance can be machined, which can highly accurately form a complicated and fine shape. Consequently, the number of optical fibers can be increased in comparison with that in the conventional cases, high-density optical connection can be achieved, and connection of high-speed and large-capacity communication can be achieved.

The number of connections of the multi-fiber optical connector may be 12, or be 16, 24, 32, 36, 48 or the like, for example. In a case of a large number of connections, a configuration may be adopted where the optical fiber insertion holes are arranged in two or three rows or the like. In this case, it is preferable that the ceramics should be machinable ceramics having a low height and facilitating fine and precise processing at low cost.

(15)

The plate according to a fifteenth invention is the plate according to thirteenth or fourteenth invention, wherein an amount of dimensional variation in a case of heating at 260° C. may be no more than 0.5 μm.

Accordingly, in a case where the optical connector is mounted on the substrate and subjected to reflow soldering, the ferrule hardly changes in dimension even if the ferrule is subjected to a high temperature due to the temperature of the reflow soldering process. As a result, the optical fibers are prevented from being misaligned, which can prevent adverse effects, such as of connection loss. Consequently, the property, such as connection loss, is unchanged before and after the reflow soldering process. Furthermore, even when the electronic components on the substrate are subjected to temperature change due to operation, the property, such as connection loss, is unchanged.

Consequently, even in a case where the optical wiring is implemented on the substrate, the optical fiber assembly having low connection loss can be achieved.

Note that the amount of dimensional variation according to the present invention is obtained by measuring the distance L between the midpoint M of the perpendicular bisector connecting the center points G1 and G2 of the guide holes, and the center point of each fiber insertion holes, and comparison between the cases before the heating test and after the heating test (see FIG. 27).

(16)

The plate according to a sixteenth invention is the plate according to any of the thirteenth to fifteenth inventions, including a plate main body that is formed to have a rectangular shape and has a thickness ranging from 0.3 to 3.0 mm, inclusive, wherein a machined portion achieved through a machining process may be formed at the plate main body.

Accordingly, polishing can be performed without breaking the plate main body. Furthermore, the guide grooves for the optical fibers, the adhesive reservoir and the like can be formed without any trouble.

If the thickness of the plate main body is less than the range described above, for example, the thickness of the thin portion becomes too small when the guide grooves are formed in the plate, and the plate is sometimes broken. Furthermore, the guide grooves having an appropriate length cannot be provided in some cases. When the plate end face is polished after the optical fibers are bonded and fixed to the plate, and the polishing is performed in a state where the plate is attached to a jig. However, the plate is possibly broken by a pressing force for polishing the end face.

The machined portions include the surface identification structure formed on the plate, the guide grooves for guiding the optical fibers into the optical fiber insertion holes, the adhesive reservoir, and the sectional shapes of the guide holes. The machinable ceramics is adopted as the material. Accordingly, the machining process is easily applied, and these machined portions can be precisely processed at a low cost.

In particular, if the optical communication connection method does not require oblique polishing, the plate main body can be configured to have a small thickness. Examples of cases that require no oblique polishing include, for instance, a case where an antireflective film is configured on the connection end face, a case where the optical fibers to be used are multimode optical fibers, and a case where a condition on the loss required for the connection portion is not strict because the connection distance is short or the like.

In a case where the connection end face is obliquely polished to prevent Fresnel reflection, the plate main body having a thickness of at least 0.5 mm allows the plate main body to be polished without being broken, and allows the guide grooves for the optical fibers, the adhesive reservoir and the like to be formed without any trouble.

(17)

The plate according to a seventeenth invention is the plate according to the sixteenth invention, wherein the machined portion may include a surface identification structure formed at a corner of the plate main body.

It is confirmed that one surface (assumed as an A surface) and the other surface (assumed as a B surface) of the plate main body are not strictly identical to each other, in terms of the forms of the optical fiber insertion holes (the inclination angles of the holes from the surface of the plate main body, the internal diameters of the holes and the like). Accordingly, the connection loss values on both the surfaces of the plate main body are not identical to each other, and are slightly different from each other. That is, since the machining process to the plate main body is cutting on one surface by a drill or the like, the shapes of the optical fiber insertion holes are not strictly symmetrical on both the surfaces. Accordingly, by forming the surface identification structure at one corner of the plate main body, the A surface and the B surface of the plate main body can be easily, visually discriminated from each other with reference to the surface identification structure.

Note that as for the surface identification structure, a method of providing a beveled part (assumed as a C surface), or providing an identification through-hole is used.

(18)

The plate according to an eighteenth invention is the plate according to the sixteenth or seventeenth invention, wherein the machined portion may include a thin portion where the plate main body formed to have the optical fiber insertion holes has a small thickness, and a thick portion, and guide grooves that communicates with the optical fiber insertion holes may be formed in an upper end face of the thick portion.

Accordingly, when the optical fibers are inserted into the respective optical fiber insertion holes, the distal ends of the optical fibers can be inserted along the guide grooves that have concave shapes and formed in the upper end face of the thick portion, and guided to the optical fiber insertion holes. Thus, the optical fiber assembly can be easily assembled.

The optical fibers are fine lines of several tens to one hundred and several tens of micrometers, and are required to be inserted into the insertion holes having a size substantially identical to the diameter of each optical fiber. Accordingly, delicate and difficult operations are required to assemble the optical fiber assembly. In particular, optical implementation on the substrate requires high-speed and large-capacity communication. Accordingly, multi-fiber optical fibers are often used, and several tens of optical fibers are required to be inserted into a single plate in some cases. The plate according to the eighteenth invention can easily perform assembly even in a case of using multi-fiber optical fibers.

(19)

The plate according to a nineteenth invention is the plate according to any of the sixteenth to eighteenth inventions, wherein the machined portion may include an adhesive reservoir formed in a surface of the plate main body having the optical fiber insertion holes.

Accordingly, the excess amount of adhesive besides use to fix the optical fibers to the optical fiber insertion holes accumulates in the adhesive reservoir, which prevents cured excess adhesive from remaining around the optical fiber insertion holes. In particular, the surface shape of the cured adhesive is not completely flat. Accordingly, uneven gaps sometimes occur due to the cured adhesive. The optical assembly according to the eleventh invention allows the adhesive to be stored in the formed concave shape. Accordingly, the end face of the plate can be kept flat. Even in a case where the ceramic plate is fixed to the contact face of the optical connector, such as the MT ferrule, in an abutting manner, a failure hardly occurs. Consequently, the optical fiber assembly as designed can be highly accurately manufactured, and the connection loss is not increased.

(20)

The plate according to a twentieth invention is the plate according to any of the sixteenth to nineteenth inventions, wherein the guide hole may be formed to have a hat-shaped cross section, and have a small hole, and a large hole formed around the small hole.

Accordingly, use of the guide pins having flanges in conformity with the hat shapes can connect the end face of the ceramic plate to the optical connector, such as the MT ferrule. The plate according to the twentieth invention allows the bolt-shaped guide pins from the ceramic plate side to be inserted, which can fix the guide pins while suppressing the amount of protrusion of the guide pins.

(21)

An optical fiber assembly according to a twenty-first invention includes the plate according to any of the thirteenth to twentieth inventions connected to one end of an optical fiber with an adhesive.

Accordingly, the one end is provided on the substrate side, thus allowing implementation on the substrate. The other end is provided at a housing of a computer or the like, which can achieve an optical fiber assembly capable of connection to optical fibers for long-distance communication, such as between computers. That is, use of the optical fiber assembly according to the twenty-first invention allows connection between the optical wiring in the housing of the computer and the optical wiring for long-distance communication.

(22)

The optical fiber assembly according to a twenty-second invention is the optical fiber assembly according to the twenty-first invention, wherein an optical connector may be connected to another end of the optical fiber, and the optical connector may be an MT connector that includes an MT ferrule.

The optical fibers with the MT ferrule can be embedded in the MPO connector or the like. Thus, the optical connector on the other end side is an optical connector in conformity with a standard typically used for long-distance communication. Accordingly, the computer that is excellent in compatibility with existing optical lines and uses an optical mounting circuit can be easily introduced.

If the one end of each optical fibers are implemented in the optical mounting circuit, the other end is provided with a standardized MT ferrule. Accordingly, a case where multiple optical mounting circuits are connected to each other is also excellent in connection compatibility.

(23)

An optical module according to a twenty-third invention may include: a substrate; a photoelectric conversion element mounted on the substrate; and the optical fiber assembly according to the twenty-first or twenty-second invention that is mounted close to the photoelectric conversion element or a silicon optical waveguide, and optically connected.

The ceramic plate is excellent in heat resistance. Accordingly, even when the optical fiber assembly and the photoelectric conversion element are mounted on the substrate and are subjected to reflow soldering, no dimensional variation due to heat occurs, and the property, such as connection loss, does not vary. The ceramic plate can be configured to have a thermal expansion coefficient similar to that of the photoelectric conversion element or the silicon optical waveguide. Accordingly, the dimensional variation is small, thus allowing the light loss to be reduced. Even at a position close to the electronic component at a high temperature, high-density optical lines can be implemented, and high-speed and large-capacity information processing can be performed. The photoelectric conversion element may be a vertical cavity surface emitting laser (VCSEL: Vertical Cavity Surface Emitting LASER), a laser diode (LD), a photodetector (PD) or the like. In selection of a material of machinable ceramics, it is more preferable to select a material having a physical property, such as linear expansion coefficient, similar to that of silicon.

BRIEF DESCRIPTION OF DRAWINGS

FIG. 1 shows a front view, a plan view, a right side view, a left side view, a bottom view, and a rear view of a plate-like ferrule according to Embodiment 1.

FIG. 2 shows a sectional view taken along line A-A' of FIG. 1(*b*), and a reference perspective view of the plate-like ferrule in Embodiment 1.

FIG. 3 shows a front view, a plan view, a right side view, a left side view, a bottom view, and a rear view of a plate-like ferrule according to Embodiment 2.

FIG. 4 shows a sectional view taken along line A-A' of FIG. 3(*b*), and a reference perspective view of the plate-like ferrule in Embodiment 2.

FIG. 5 shows a front view, a plan view, a right side view, a left side view, a bottom view, and a rear view of a plate-like ferrule illustrating a modification example of Embodiment 2.

FIG. 6 shows a front view, a plan view, a right side view, a left side view, a bottom view, and a rear view of a plate-like ferrule according to Embodiment 3.

FIG. 7 shows a sectional view taken along line A-A' of FIG. 6(*b*), and a reference perspective view of the plate-like ferrule in Embodiment 3.

FIG. 8 shows a front view, a plan view, a right side view, a left side view, a bottom view, and a rear view of a plate-like ferrule according to Embodiment 4.

FIG. 9 shows a sectional view taken along line A-A' of FIG. 8(*b*), and a reference perspective view of the plate-like ferrule in Embodiment 4.

FIG. 10 is a schematic diagram of an optical module mounted on a substrate.

FIG. 11 is a schematic diagram of an optical module mounted close to an electronic component on a substrate.

FIG. 12 is a schematic diagram for illustrating a process of fixing optical fibers to the plate-like ferrule in Embodiment 1.

FIG. 13 shows a front view, a plan view, a right side view, a left side view, a bottom view, and a rear view of a modification example of the plate-like ferrule in Embodiment 1.

FIG. 14 shows a sectional view taken along line A-A' of FIG. 13(*b*), and a reference perspective view of the modification example of the plate-like ferrule in Embodiment 1.

FIG. 15 shows a front view, a plan view, a right side view, a left side view, a bottom view, and a rear view illustrating an example of a 16-core plate-like ferrule.

FIG. 16 shows a front view, a plan view, a right side view, a left side view, a bottom view, and a rear view illustrating an example of a 24-core plate-like ferrule.

FIG. 17 shows a front view, a plan view, a right side view, a left side view, a bottom view, and a rear view illustrating another example of a 24-core plate-like ferrule.

FIG. 18 shows a front view, a plan view, a right side view, a left side view, a bottom view, and a rear view illustrating an example of a 32-core plate-like ferrule.

FIG. 19 shows a front view, a plan view, a right side view, a left side view, a bottom view, and a rear view illustrating another example of a 32-core plate-like ferrule.

FIG. 20 shows a front view, a plan view, a right side view, a left side view, a bottom view, and a rear view illustrating an example of a 36-core plate-like ferrule.

FIG. 21 is a front view of an example of an 84-core plate-like ferrule.

FIG. 22 is a schematic diagram for illustrating a state of a connection end face of the plate-like ferrule in Embodiment 1.

FIG. 23 is a schematic diagram for illustrating an example of a jig for fixing the plate-like ferrule.

FIG. 24 shows a front view, a plan view, a right side view, a left side view, a bottom view, and a rear view illustrating an example of the jig for fixing the plate-like ferrule.

FIG. 25 is a schematic diagram for illustrating an example of implementing the plate-like ferrule in an MPO connector.

FIG. 26 is a schematic enlarged diagram showing an example of implementing the plate-like ferrule in the MPO connector.

FIG. 27 is a schematic diagram for illustrating a method of measuring an amount of dimensional variation of the end face.

DESCRIPTION OF EMBODIMENTS

Hereinafter, referring to the drawings, embodiments of the present invention are described. Embodiments 1 to 4 are described as the embodiments of the present invention. However, each embodiment may be solely implemented, and one or more embodiments may be combined and implemented.

In the following description, the same components are assigned the same symbols. The names and functions of them are the same. Accordingly, detailed description of them is not repeated.

Embodiment 1

FIGS. 1(*a*), 1(*b*), 1(*c*), 1(*d*), 1(*e*), and 1(*f*) respectively show a front view, a plan view, a right side view, a left side view, a bottom view, and a rear view of a plate-like ferrule in Embodiment 1. FIGS. 2(*a*) and 2(*b*) respectively show a sectional view taken along line A-A' of FIG. 1(*b*), and a reference perspective view of the plate-like ferrule in Embodiment 1.

An optical fiber assembly in this embodiment is formed of a ceramic plate, and includes: a plate-like ferrule 100 that has optical fiber insertion holes 103, and guide holes 102 for guide pin insertion; and optical fibers 11 inserted into the respective optical fiber insertion holes 103 of the ferrule 100.

(Plate Main Body)

The plate in this embodiment is formed to have a rectangular shape, and can be formed as a rectangle, for example. The ceramic plate 100 may have dimensions of a lateral width ranging from 5 to 8 mm, inclusive, a vertical length ranging from 2 to 4 mm, inclusive, and a thickness ranging from 0.3 to 3.0 mm, inclusive. Note that with certain standards of optical connection and a certain number of connections, the lateral width and the vertical width may be more than what is exemplified here.

Preferably, the ceramic plate 100 has a thickness of at least 0.5 mm, and more preferably, no more than 2.5 mm. If the optical fibers 11 have a diameter of 0.25 mm, the thickness of the ceramic plate 100 can be no more than 2.5 mm. If the optical fibers 11 have a diameter of 0.125 mm, the plate thickness can be no more than 1.25 mm. Accordingly, the internal diameters of the optical fiber insertion holes 103 can be highly accurately processed.

In particular, in a case where the connection end face is obliquely polished using single-core optical fibers, a plate main body having a thickness of at least 0.5 mm allows the plate main body to be polished without being broken, and allows guide grooves for the optical fibers 11, an adhesive reservoir and the like to be formed without any trouble.

On the other hand, if the optical communication connection method does not require oblique polishing, the plate main body can be configured to have a smaller thickness. Examples of cases that require no oblique polishing include, for instance, a case where an antireflective film is configured on the connection end face, a case where the optical fibers 11 to be used are multimode optical fibers, and a case where a condition on the loss required for the connection portion is not strict because the connection distance is short or the like. In this case, the thickness of the ceramic plate 100 may be about 0.3 mm. A preferable thickness of the ceramic plate 100 ranges from 0.3 to 2.5 mm, inclusive.

A more preferable thickness of the ceramic plate 100 may vary depending on whether a thin portion 123 is provided or not (see Embodiment 2 and a modification example of Embodiment 2 described later).

That is, in a case where optical polishing is orthogonal polishing, and two or more rows of the optical fiber insertion holes 103 are formed, and multiple stages of thin portions 123 are provided, a more preferable thickness of the ceramic plate 100 is at least 0.5 mm.

In a case where the connection end face is optically polished obliquely at 8°, and a single row of the optical fiber insertion holes 103 is formed, a more preferable thickness of the ceramic plate 100 is at least 0.5 mm.

In a case where the connection end face is optically polished obliquely at 8°, and two or more rows of optical fiber insertion holes 103 are formed, and multiple stages of thin portions 123 are formed, the thickness of the ceramic plate 100 can be 0.5 mm, but in view of achieving a sufficient strength, a more preferable thickness of the ceramic plate 100 is at least 0.6 mm.

Another example of a more preferable thickness of the ceramic plate 100 may be at least 1.0 mm or at least 1.2 mm. The upper limit in this case is no more than 2.5 mm.

Note that the ceramic plate 100 exemplified in FIG. 1 has dimensions of a lateral width L1 of 6.4 mm, a vertical dimension L2 of 2.5 mm, and a thickness of 0.5 mm.

The plate in this embodiment may have, for example, the distance between a pair of guide holes 102 ranging from 4.6 to 5.3 mm, inclusive, the pitch of the optical fiber insertion holes 103 ranging from 0.125 to 0.25 mm, inclusive, and the dimension between the optical fiber insertion holes 103 arranged at the opposite ends ranging from 2.75 to 3.75 mm, inclusive. The internal diameter of the guide hole 102 may range from 0.55 to 0.7 mm, inclusive. The ceramic plate 100 may be configured to have a size allowing connection compatibility with an MT ferrule.

FIG. 1 shows an example of a 12-core ceramic plate 100. In this example, the guide holes 102 have an internal diameter of 0.7 mm, the distance between the pair of guide holes 102 is 4.6 mm, the optical fiber insertion holes 103 have an internal diameter $ of 125 μm, and the pitch of the optical fiber insertion holes 103 is 250 μm.

The optical fiber insertion holes 103 are formed through the plate main body in a thickness direction, and a single row of the optical fiber insertion holes 103 is formed along a longitudinal direction of the rectangular plate main body. The ferrule 100 used for the optical fiber assembly in this embodiment is what is called a multi-fiber ferrule.

The optical fibers 11 are fixed to the respective optical fiber insertion holes 103 of the ceramic plate 100 by adhesive filled in the optical fiber insertion holes 103.

A connected member to which the connection end face of the ceramic plate 100 is connected is not specifically limited. For example, connection may be made to an existing MT ferrule or the like, or to an optical element. Likewise, the connection method is not specifically limited. For example, fixation and connection may be made using an adhesive, or physical contact or pressing fixation may be made by various types of means, such as a jig 400 described later, guide pins provided with flanges, or a clip.

(Machinable Ceramics)

Preferably, the ceramics used in the present invention is machinable ceramics. By adopting the machinable ceramics, fine and precise processing with a low hardness can be performed at low cost. The ferrule 100 made of ceramics may be subjected to a metallizing process by the Mo—Mn method or the active-metal method so as to support reflow soldering.

The machinable ceramics is a material that allows a base material to be subjected to a machine cutting process to finish a desired shape. Preferably, complex ceramics can be used that is obtained by adding ceramics serving as a machinable agent to structural oxide ceramics, such as alumina ceramics, and sintering them by solid-phase reaction. The complex ceramics manufactured by this method (e.g., alumina machinable agent complex ceramics: machinable alumina) is machinable ceramics having a structure where cracks develop along interfaces between structural oxide ceramics particles (alumina) and machinable agent ceramics particles.

The characteristics of the machinable ceramics are to achieve a machinable property while the physical property of the structural oxide ceramics serving as a base is hardly degraded, in comparison with a case of supplying a machinable property through a porous property. Furthermore, structural oxide ceramics, such as alumina or zirconia that has well-known properties is allowed to have a machinable property.

Use of the ceramic plate 100 made of machinable ceramics can design a heat-resistant optical connection component, such as a heat-resistant ferrule.

The ceramic plate 100 is configured to have the same interface as that of an optical connector, such as an MT ferrule, thereby allowing connection compatibility to be established with the optical connector, such as the MT ferrule. In this case, the positions and sizes of the optical fiber insertion holes 103 and the guide holes 102 are the same between the ceramic plate 100 and the MT ferrule. That is, the ceramic plate 100 and the MT ferrule can be positioned to each other using the guide pins. Consequently the optical fibers 11 attached to the ceramic plate 100, and the optical fibers 11 attached to the MT ferrule can be connected to each other.

Accordingly, the ceramic plate 100 can be used as a replacement of the MT ferrule. To hold the ceramic plate 100 and the optical fibers 11, a member that mechanically holds them may be provided. In a case of connecting the ceramic plate 100 to the MT ferrule, the optical fibers 11 may be held by a holding member that connects the ceramic plate 100 with the MT ferrule. In a case of mounting the ceramic plate 100 to a substrate 14, the optical fibers 11 may be held by a holding member fixed to the substrate 14.

Preferably, the machinable ceramics used for the ceramic plate 100 in this embodiment is nitride-based machinable ceramics. Among types of nitride-based machinable ceramics, machinable ceramics where boron nitride and fine ceramics are combined is more preferable. Since it is thus excellent in mechanical strength and workability, precise processing can be applied.

The density of the machinable ceramics may range from 2.5 to 4.0 g/cm$^3$, inclusive, and preferably, ranges from 3.4 to 3.6 g/cm$^3$, inclusive. The bending strength of the machinable ceramics may range from 100 to 550 MPa, inclusive, and preferably, ranges from 300 to 350 MPa, inclusive. The Vickers hardness of the machinable ceramics may range from 1.0 to 8.0 GPa, inclusive, and preferably, ranges from 2.0 to 5.0 GPa, inclusive, and preferably, ranges from 2.2 to 2.5 GPa, inclusive. The average thermal linear expansion coefficient of the machinable ceramics may range from 0.5 (10-6K) to 10 (10-6K), inclusive, and preferably, ranges from 3.5 (10-6K) to 5.0 (10-6K), inclusive.

Accordingly, it is excellent in workability, and excellent in heat resistance, and has a thermal property close to that of another optical element, such as of silicon. Consequently, the connection loss can be minimized.

The aspect ratio of the processing accuracy of the ceramic plate 100 can be configured to be 10:1. If the thickness of the plate main body is 0.8 mm in this case, highly precise processing with the same design can be performed even with 80 μm fiber holes.

In a case of an MT ferrule made of a resin, such as PPS, an adhesive is dropped and filled into an adhesive window when the optical fibers 11 are bonded to the MT ferrule. Accordingly, when the MT ferrule is exposed to a high temperature, the fibers are drawn in because the resin, such as PPS, and the adhesive have different thermal expansion coefficients. Consequently, no PC connection can be achieved, and it is difficult to maintain stable connection.

As shown in FIGS. 1 and 2, in Embodiment 1, the ferrule 100 may have the plate main body formed to have a rectangular shape, and a beveled part 110 may be formed at one corner of the plate main body.

As described above, it is confirmed that one surface (A surface) and the other surface (B surface) of the plate main body are not completely identical to each other, in terms of the forms of the optical fiber insertion holes 103 (the inclination angles of the holes from the surface of the plate main body, the internal diameter ϕ of each hole and the like). Consequently, the connection loss is not completely identical between both the surfaces of the plate main body. That is, since the machining process to the plate main body is cutting on one surface by a drill or the like, the shapes of the optical fiber insertion holes 103 are not strictly symmetrical on both the surfaces. Accordingly, by forming the beveled part (C surface) at one corner of the plate main body, the A surface and the B surface of the plate main body can be easily, visually discriminated from each other.

Note that the plate main body shown in FIG. 1 is provided with the C surface 110 at the upper right corner of the A surface. Alternatively, the C surface 110 may be provided at another corner, or the C surfaces 110 may be respectively provided at corners at multiple sites, thus allowing the A surface and the B surface to be discriminated from each other. Instead of the beveled part (C surface), a curved surface (round shape) may be formed at a corner of the plate main body.

FIGS. 13 and 14 show a modification example provided with an identification through-hole 111 instead of the C surface 110 in FIG. 1. This configuration allows a through-hole to be formed using a drill or the like, thus facilitating processing of the ceramics. Furthermore, this allows the surface direction to be identified, and a boss may be provided on the substrate 14, which can assist fitting so as to uniquely determine the plate arrangement direction.

Accordingly, the direction of attaching the ferrule 100 with respect to a light source can be prevented from being erroneously identified.

The plate-like ferrule 100 according to the present invention includes the optical fiber insertion holes 103, and the guide holes 102 for guide pin insertion.

Since the plate-like ferrule 100 is made of ceramics, the dimensional variation of the ferrule 100 hardly occurs even in a case where the ferrule 100 is subjected to a high temperature due to the temperature of the reflow soldering process (typically, about 260° C.) during mounting of an optical connector 12 on the substrate 14 by reflow soldering.

Preferably, the amount of dimensional variation of the ferrule 100 in this embodiment is no more than 0.5 μm, more preferably, no more than 0.1 μm, and further preferably, no more than 0.05 μm. Note that the amount of dimensional variation is measured by a method of measuring the amount of dimensional variation of the end face described later, and is an average value of amounts of positional variation R of each fiber insertion hole in comparison before the heating test and after the heating test.

The linear expansion coefficient of the ferrule 100 is similar to the linear expansion coefficient of a photoelectric conversion element or a silicon optical waveguide. Consequently, the dimensional accuracy can be improved so that the dimensional variation is small even with heating by the reflow soldering process (the maximum temperature of 260° C. for several minutes according to a temperature profile).

FIG. 12 is a schematic diagram for illustrating a process of fixing the optical fibers 11 to the ceramic plate 100 in Embodiment 1. In a case of using tape-shaped optical fibers 11, distal ends of the optical fibers 11 are exposed as shown in FIG. 12(*a*). Furthermore, an adhesive is applied to the optical fiber insertion holes 103 on the insertion surface side of the ceramic plate 100, and insertion is made into the optical fiber insertion holes 103 of the ceramic plate 100 as shown in FIG. 12(*b*).

(Adhesive)

The ceramic plate 100 according to the present invention allows the optical fibers 11 to be fixed to the respective optical fiber insertion holes 103 of the ferrule 100 by the adhesive filled in the optical fiber insertion holes 103. That is, before the optical fibers 11 are inserted into the respective optical fiber insertion holes 103 of the ceramic plate 100 according to the present invention, the adhesive is applied to the optical fiber insertion holes 103 on the insertion surface side of the ceramic plate 100. The optical fibers 11 are inserted through the respective optical fiber insertion holes 103, with the applied adhesive being extruded and passing therethrough. According to such a configuration, slight spaces between the optical fibers 11 and the respective optical fiber insertion holes 103 are filled with the adhesive. Consequently, when the adhesive is cured, the optical fibers 11 are reliably fixed to the ceramic plate 100.

Note that it is preferable to use an adhesive having a relatively low viscosity. Insertion of the optical fibers 11 allows the adhesive to enter the optical fiber insertion holes 103 together with the optical fibers 11.

When the optical fibers 11 are inserted through the respective optical fiber insertion holes 103, it is preferable to arrange the fibers with the distal ends being oriented upward. Such a configuration allows the adhesive adhering to the surfaces of the optical fibers 11 inserted through the optical fiber insertion holes 103 to be returned to the optical fiber insertion holes 103 due to the own weight and/or capillarity, thus making the adhesive accumulate in the holes of the ceramic plate 100 through which the optical fibers 11 are inserted.

By the adhesive being cured in this state, a larger amount of the adhesive is present on a side where the optical fibers 11 protrude from the ceramic plate 100, and the optical fibers 11 are reinforced. Accordingly, failures, such as presence of internal cracks and bending, hardly occur when the connection end face is polished. Consequently, worsening of the connection loss, and connection failure can be prevented.

The usable adhesive may be an ultraviolet cure adhesive excellent in heat resistance, a thermosetting adhesive, a two-component reactive adhesive, etc.

In the case of using an ultraviolet cure adhesive, the adhesive is filled between the optical fiber insertion holes 103 and the optical fibers 11, and subsequently is irradiated with ultraviolet light, thus curing the adhesive. The thermosetting adhesive may be, for example, an epoxy-based adhesive.

The epoxy-based adhesive is excellent in adhesiveness between the quartz glass of the optical fibers 11 and the machinable ceramics of the ceramic plate 100. Consequently, even if the ceramic plate 100 is configured to have a small thickness, the optical fibers 11 can be reliably fixed. Even if the ceramic plate 100 to which the optical fibers 11 are bonded is optically polished, the optical fibers 11 are not detached.

After the adhesive is completely cured, the contact face that is the distal end face of the ceramic plate 100 (ferrule) is polished, the adhesive having leaked from the optical fiber insertion holes and been cured is removed by polishing, and the end faces of the optical fibers 11 are optically polished and mirror-finished.

(Connection End Face)

FIG. 22 is a schematic diagram for illustrating the state of the connection end face of the ceramic plate 100 in Embodiment 1. FIG. 22 shows part of a sectional view (an enlarged view of the connection end face) taken by section of the ceramic plate 100 at the optical fiber insertion holes 103, and illustration with a magnification of about 200-fold only in the connection direction.

Typically, the optical fibers are made of quartz glass, and have a Vickers hardness (JIS Z2244; hereinafter, simply called a hardness) normally ranging from 8.6 to 9.8 GPa, inclusive. The machinable ceramics of the ceramic plate 100 in this embodiment has a hardness that is lower than that of quartz glass and is no more than 8 GPa.

Accordingly, the connection end face of the optical fiber assembly has a higher hardness at the portion of the optical fibers 11 than that at the main body portion of the ceramic plate 100. Consequently, optical polishing of the connection end face of the optical fiber assembly for optical connection performs shaving off in turn from the main body portion of the ceramic plate 100 that has a low hardness. Accordingly, as shown in FIG. 22, at the connection end face of the optical fiber assembly having been optically polished, the connection end faces of the optical fibers 11 protrude from the end face of the main body of the ceramic plate 100 to form convex shapes.

Consequently, when the optical fiber assembly is optically connected, the convex shapes of the optical fibers 11 come into contact with each other and are deformed, thus achieving physical contact (PC) connection. Since Fresnel reflection is thus suppressed, the amount of signal reduction can be significantly reduced. Consequently, a refractive index matching agent, an optical lens or the like is not required to be used at the connection end of the connector, and an optical signal can be connected with a low loss.

Note that it is appropriately selected whether a refractive index matching agent, an optical lens or the like is used at the connection end face or not according to the application or purpose of optical connection or the like.

In the case of using a refractive index matching agent, this agent may be what has a refractive index similar to a glass refractive index of the optical fibers 11. Accordingly, Fresnel reflection can be suppressed. Also in a case of using an optical lens, the type and the like thereof are appropriately selected. Without limitation to a spherical lens, for example, a GRIN lens having a refractive index distribution in glass may be used.

<Connection End Face Comparison Test>

Ceramic plates 100 made of different materials were prepared and implemented with optical fibers 11, the optical connection end faces were polished, and the states of the connection end faces were compared.

(1) Example

As the machinable ceramics, nitride-based machinable ceramics (Photoveel II-S made by Ferrotec Material Technologies Corporation) was prepared, and was machined, thus forming 12 pieces having the shape shown in FIG. 1 in Embodiment 1. The machinable ceramics was ceramics where boron nitride and fine ceramics were combined, and had a Vickers hardness of 2.3 GPa.

An adhesive (thermosetting epoxy resin) was applied around the optical fiber insertion holes 103 on the opposite side of the connection end face, 12 optical fibers 11 having a diameter of 125 μm were respectively inserted into the optical fiber insertion holes 103, and the adhesive was cured by heating. Note that the optical fibers were all quartz optical fibers, and had a Vickers hardness of 9 GPa.

The thus obtained ceramic plate 100 was fixed to the jig 400 (see FIGS. 23 and 24) with the adhesive, and the shape of the MT ferrule was formed. The connection end face of the ceramic plate 100 was optically polished using a general-purpose optical connector polisher.

According to the method described above, 12 optical fiber assemblies in the Example were fabricated. The connection end face of each ceramic plate 100 was measured using an MT ferrule end face shape measurement instrument (daisi-MT).

As a result, as shown in FIG. 22, it was confirmed that each optical fiber assembly in the Example had a shape where the optical fibers 11 protruded from the connection end face of the ceramic plate 100. The average value of the amount of protrusion was 2.471 μm, and the standard deviation thereof was 181.

This result can be discussed so that since the optical fibers 11 had a higher hardness than the ceramic plate 100 in the Example, optical polishing of the ceramic plate 100 to which the optical fibers 11 were attached made the ceramic plate 100 more polished, and the end faces of the optical fibers 11 protruded from the end face of the ceramic plate 100 to have convex shapes.

(2) Comparison Example

Similar to the Example, except for use of silicon nitride ceramics (HPSN606) as the ceramics, 12 optical fiber assemblies were fabricated. The silicon nitride ceramics had a Vickers hardness of 13 GPa.

The thus obtained connection end face in the comparison example was measured by the MT ferrule end face shape measurement instrument (daisi-MT).

As a result, it was confirmed that each optical fiber assembly in the comparison example had a shape where the optical fibers 11 were concave from the connection end face of the ceramic plate 100. The average value of the concave amount was 1.433 μm and the standard deviation thereof was 352.

This result is thought to mean that since the ceramic plate 100 in the comparison example had a higher hardness than the optical fibers 11, optical polishing of the ceramic plate 100 to which the optical fibers 11 were attached made the optical fibers 11 more polished, and the end faces of the optical fibers 11 were formed to have concave shapes with respect to the end face of the ceramic plate 100.

<Reflow Soldering Heating Test>

(1) Measurement of Amount of Connection Loss

The optical fibers 11 were implemented into the ferrule 100 in this embodiment, and a reflow soldering heating test was performed. As the optical fibers 11, 12-core ribbon fiber (MFD: 9.2 μm±0.4 μm; 1,310 nm) made by Corning was used, and the reflow soldering heating test was performed in a condition at 260° C. for three hours.

Subsequently, the ferrule 100 implemented with the optical fibers 11 was returned to ordinary temperature (20° C.), the optical fibers 11 were attached to the after-mentioned jig 400, and connected to an MT ferrule 200 (12MT-PA-SLS made by Hakusan) using a clip for 12 cores. Note that the connection end face of the MT ferrule 200 was PC-polished obliquely at eight degrees, and that of the ceramic plate 100 was subjected to orthogonal surface polishing, and the faces were connected via a refractive index matching agent (S918X-31 made by FITEL).

As a result, the connection loss in a case of connection on the A surface side of the ceramic plate 100 was 0.39 dB at the average and 0.89 dB at the maximum, and the connection loss in a case of connection on the B surface side was 0.43 dB at the average and 1.53 dB at the maximum.

It is thus confirmed that the ceramic plate 100 in this embodiment can exert a low-loss performance.

(2) Measurement of Amount of Dimensional Variation of End Face

Similar to the measurement of amount of connection loss described above, the optical fibers 11 were implemented into the ferrule 100 in this embodiment, and the eccentric amounts of the optical fiber insertion holes 103 were measured before and after the reflow soldering heating test (at 260° C. for three hours). As shown in FIG. 27, the eccentric amount in this case is the average value of the amounts of positional variation R of the fiber insertion holes 103 in comparison before the heating test and after the heating test with reference to the midpoint M of the perpendicular bisector connecting the center points G1 and G2 of the guide holes 102.

As a result of the measurement, the amount of positional variation in the X-axis direction (optical fiber arrangement direction) had an average value of 0.03 μm, and the amount of positional variation in the Y-axis direction had an average value of 0.03 μm. Consequently, the amount of dimensional variation in this measurement was 0.042 μm.

Accordingly, it was confirmed that the machinable ceramics excellent in heat resistance maintained excellent positional accuracy even in the case of being exposed to a high temperature.

Embodiment 2

FIGS. 3(*a*), 3(*b*), 3(*c*), 3(*d*), 3(*e*), and 3(*f*) respectively show a front view, a plan view, a right side view, a left side view, a bottom view, and a rear view of a plate-like ferrule in Embodiment 2. FIGS. 4(*a*) and 4(*b*) respectively show a sectional view taken along line A-A' of FIG. 3(*b*), and a reference perspective view of the plate-like ferrule in Embodiment 2.

As shown in FIG. 3, in Embodiment 2, the plate main body includes the thin portion 123 where the plate main body formed to have the optical fiber insertion holes 103 has a small thickness, and a thick portion 122, and guide grooves 121 (concave grooves) that communicate with the optical fiber insertion holes 103 are formed in an upper end face of the thick portion 122.

The thin portion 123 is formed to be thin by cutting a substantially upper half of the plate main body. The thick portion 122 (portion of the plate main body before the cutting) is formed at a substantially lower half of the plate main body. Part of a boundary between the thin portion 123 and the thick portion 122 is horizontal line passing through substantially center points of the optical fiber insertion holes 103. As shown in FIG. 4, the guide grooves 121, which communicate with the optical fiber insertion holes 103, are formed in the upper end face of the thick portion 122. Along the guide grooves 121, the distal ends of the optical fibers 11 can be easily inserted into the respective optical fiber insertion holes 103.

It is preferable that the thickness of the thin portion 123 (plate thickness) should be at least 0.3 mm, and it is preferable that a depth of at least 0.1 mm relative to the thickness of the thick portion 122 should be formed (i.e., preferably, the thickness of the thin portion 123 is thinner than the thickness of the thick portion 122 by at least 0.1 mm). For example, in a case where the thickness of the plate main body is 1.0 mm, it is preferable that the plate thickness of the thin portion 123 should range from 0.3 to 0.9 mm, inclusive.

The thin portion 123 has a thickness of at least 0.3 mm, which can reliably keep the plate thickness even after the connection end face is polished at eight degrees. The thin portion 123 has a thickness so as to have a depth of at least 0.1 mm relative to the thick portion 122, thereby allowing the distal ends of the optical fibers 11 to be easily inserted into the respective optical fiber insertion holes 103.

In a case where the thickness of the thin portion 123 is far smaller than the range described above, the thin portion 123 is sometimes broken. In a case where the thickness is far larger than the range described above, the length dimension of each guide groove 121 formed in the upper end face of the thick portion 122 is too small, and the optical fibers 11 are sometimes incapable of being guided along the guide grooves 121. The sectional shape of each guide groove 121 is a semicircular shape. Note that the sectional shape of each guide groove 121 may be a semicircular shape or a rectangular shape. Each guide groove 121 may have a size identical to the size of each fiber (radius), or may be formed to be larger than each fiber.

In FIGS. 3 and 4, the case where one row of the optical fiber insertion holes 103 is arranged is exemplified. Alternatively, in a case where multiple rows of the optical fiber insertion holes 103 are arranged, a plurality of thin portions 123 may be provided stepwise, and multiple stages of guide grooves 121 continuous to the optical fiber insertion holes 103 arranged vertically in multiple stages may be formed.

Modification Example of Embodiment 2

FIGS. 5(*a*), 5(*b*), 5(*c*), 5(*d*), 5(*e*), and 5(*f*) respectively show a front view, a plan view, a right side view, a left side view, a bottom view, and a rear view of a plate-like ferrule illustrating a modification example of Embodiment 2.

In the modification example of Embodiment 2, two or more rows of the optical fiber insertion holes 103 are arranged. The thin portion 123 and the thick portion 122 are formed at the plate main body, the thin portion 123 has two stages of thicknesses, and the upper end face of the thick portion 122, and the stages of the thin portion 123 are formed stepwise.

In the upper end face of the thick portion 122, and the step portions of the thin portion 123, guide grooves 121*a*, 121*b*, . . . (concave grooves) continuous to the optical fiber insertion holes 103 are formed. Thus, the stepwise stages are provided at two rows of the insertion hole portions of optical fiber insertion holes 103 through which the optical fibers 11 are inserted. The stages are respectively provided with the guide grooves 121*a* and 121*b*.

Accordingly, the optical fibers 11 are arranged along the concave grooves provided at the stepwise stages, and then the optical fibers 11 can be inserted into the respective optical fiber insertion holes 103. Consequently, even in a case where the number of optical fiber insertion holes 103 is large and high-density optical connection is performed, the optical fibers 11 can be easily inserted into the optical fiber insertion holes 103 provided in the ceramic plate 100 with small dimensions.

In comparison with the flat ceramic plate 100, the adhesive substantially accumulates in the step portions. Accordingly, a sufficient amount of adhesive is filled and applied into the optical fiber insertion holes 103 when the optical fibers 11 are inserted.

In the case where two or more rows of optical fiber insertion holes 103 are provided and multiple stages of guide grooves 121 are provided as in this modification example, it is preferable that the thickness of the ceramic plate 100 should be at least 0.5 mm. In a case where two or more rows of optical fiber insertion holes 103 are provided and the connection end face is obliquely polished, the thickness of the ceramic plate 100 may be 0.5 mm, but in view of achieving a sufficient strength, it is preferable that the thickness of the ceramic plate 100 should be at least 0.6 mm.

FIG. 6 shows an example where the thickness of the ceramic plate 100 is 1.0 mm, and the distance of each guide groove (depth of each stage) is 0.1 mm. In a case where the thickness of the ceramic plate 100 is 0.6 mm, the distance of each guide groove (depth of each stage) may be at least 0.05 mm.

Embodiment 3

FIGS. 6(*a*), 6(*b*), 6(*c*), 6(*d*), 6(*e*), and 6(*f*) respectively show a front view, a plan view, a right side view, a left side view, a bottom view, and a rear view of a plate-like ferrule in Embodiment 3. FIGS. 7(*a*) and 7(*b*) respectively show a sectional view taken along line A-A' of FIG. 6(*b*), and a reference perspective view of the plate-like ferrule in Embodiment 3.

In this embodiment, an adhesive reservoir 130 that includes the optical fiber insertion holes 103 is provided in the surface of the plate main body in a concave manner.

The adhesive reservoir 130 may be a groove formed in the plate main body so as to include all the optical fiber insertion holes 103 formed in the plate main body. That is, since the multi-fiber optical fiber insertion holes 103 are arranged in a line along the longitudinal direction of the plate main body, the adhesive reservoir 130 is formed as a concave that is long in the longitudinal direction of the plate main body so as to include all the optical fiber insertion holes 103.

The length dimension (lateral width dimension) of the adhesive reservoir 130 may be about a length that can accommodate all the fiber holes, and the vertical width dimension may be about a width that can accommodate each fiber hole.

It is preferable that the plate thickness of the adhesive reservoir 130 should be at least 0.3 mm, and it is preferable that a depth of at least 0.1 mm relative to the thickness of the plate main body should be formed (i.e., preferably, the thickness of the thin portion 123 is thinner than the thickness of the thick portion 122 by at least 0.1 mm). For example, in a case where the plate thickness of the plate main body is 1.0 mm, it is preferable that the plate thickness of the adhesive reservoir 130 should range from 0.3 to 0.9 mm, inclusive.

The adhesive reservoir 130 has a plate thickness of at least 0.3 mm, which can reliably keep the plate thickness even after the connection end face is polished at eight degrees. The adhesive reservoir 130 has a plate thickness so as to have a depth of at least 0.1 mm relative to the plate main body, thereby allowing the adhesive to be favorably filled.

Fixation of the optical fibers 11 into the respective optical fiber insertion holes 103 can be similarly performed as described above.

That is, after the adhesive is applied to the adhesive reservoir 130, the optical fibers 11 are inserted into the respective optical fiber insertion holes 103. At this time, in a state where the adhesive is adhered to the distal ends of the optical fibers 11, the optical fibers 11 are inserted into the respective optical fiber insertion holes 103. Subsequently, the adhesive is cured.

As described above, the adhesive reservoir 130 is formed so as to include the fiber holes, which allows the adhesive to be stored in the adhesive reservoir 130, and prevents cured excess adhesive from protruding beyond the surface of the ceramic plate 100.

Consequently, the end face of the ceramic plate 100 can be kept flat, and even when the ceramic plate 100 is fixed to the contact face of the optical connector 12, such as the MT ferrule, in an abutting manner, a failure, such as occurrence of a gap, hardly occurs. In comparison with a case without the adhesive reservoir 130, the optical fibers 11 can be reliably fixed to the ceramic plate 100 with a sufficient amount of adhesive.

Embodiment 4

In this embodiment, a different-diameter structure 140 for fixing the plate main body is formed at each guide hole 102.

FIGS. 8(*a*), 8(*b*), 8(*c*), 8(*d*), 8(*e*), and 8(*f*) respectively show a front view, a plan view, a right side view, a left side view, a bottom view, and a rear view of a plate-like ferrule in Embodiment 4. FIGS. 9(*a*) and 9(*b*) respectively show a sectional view taken along line A-A' of FIG. 8(*b*), and a reference perspective view of the plate-like ferrule in Embodiment 4.

In Embodiment 4, the guide holes 102 are formed to have hat-shaped cross sections, and each have a small hole 141, and a large hole 142 formed around the small hole 141. The small hole 141 is formed on the connection end face side, and the large hole 142 is formed on the opposite side.

Use of the guide pins having the hat-shaped flanges can fix the end face of the ceramic plate 100 to the end face of the optical connector 12, such as the MT ferrule. Accordingly, the end face of the ceramic plate 100 can be fixed without use of adhesive, thus preventing the property, such as the connection loss, from varying.

In this case, the thickness of the plate main body may range from 0.5 to 2.5 mm, inclusive. A preferable thickness of the plate main body may range from 0.5 to 1.3 mm, inclusive.

By configuring the range described above, the internal diameter ϕ of each optical fiber insertion hole 103 corresponding to the optical fiber 11 having a diameter of 0.125 mm can be highly accurately processed. On the other hand, in view of configuring the ferrule 100 that can support optical fibers 11 having a wide variety of diameters, it is preferable that the thickness of the plate main body range from 0.5 to 2.5 mm, inclusive.

According to the configuration in this embodiment, use of the guide pins having flanges in conformity with the hat shapes can connect the end face of the ceramic plate 100 to the optical connector, such as the MT ferrule, and the amount of protrusion of each guide pin can be suppressed.

In a case where the ceramic plate 100 is fitted and connected to the MT ferrule or the like, use of the guide pins with flanges allows the flanges of the guide pins to be stored in the respective hat-shaped large holes. Accordingly, the entire surface of the fiber insertion face can be used while the positions of the guide pins are maintained.

In particular, this embodiment is excellent in use as a module mounted on the substrate 14 as shown in FIG. 11. That is, in a case where a structure of fixation with the guide pins is provided on the substrate side, the holes into which the guide pins are inserted therein are through-holes. Accordingly, no mechanism of holding the guide pins is provided on the substrate. Thus, the mechanism in this embodiment for holding the guide pins on the ceramic plate side is required.

FIGS. 8 and 9 thus show the example where the guide holes 102 have rectangular hat shaped cross sections. Without limitation to the rectangular shape, any shape may be adopted only if the shape supports the guide pin (wedge shape).

Other Embodiments

The aforementioned embodiments show the examples including the 12-core ceramic plate 100 provided with 12 optical fiber insertion holes 103. However, the ceramic plate 100 according to the present invention is not limited to 12-core one.

The machinable ceramics is excellent in mechanical strength and heat resistance. Accordingly, by cutting, grinding, electrical discharge machining, laser machining or the like, a complicated and fine shape can be highly accurately formed. Consequently, high-density optical connection can be achieved, and connection of high-speed and large-capacity communication can be achieved.

FIG. 15 shows an example of a 16-core ceramic plate 100. In the case of this example, the internal diameter of each guide hole 102 is 0.55 mm, and the distance between the pair of guide holes 102 is 5.3 mm. The internal diameter ϕ of each optical fiber insertion hole 103 is 125 μm, and the pitch of the optical fiber insertion holes 103 is 250 μm.

Note that the external dimensions of the ceramic plate 100 exemplified in FIG. 15 are the same as in FIG. 1 exemplified in Example 1.

FIG. 16 shows an example of a 24-core ceramic plate 100. In the case of this example, the internal diameter of each guide hole 102 is 0.7 mm, and the distance between the pair of guide holes 102 is 4.6 mm. The optical fiber insertion holes 103 are configured in two rows that are 0.25 mm apart from the center line connecting the centers of the guide holes 102, and the internal diameter ϕ of the optical fiber insertion holes 103 on each row is 125 μm, and the pitch of the optical fiber insertion holes 103 is 250 μm.

Note that the external dimensions of the ceramic plate 100 exemplified in FIG. 16 are the same as in FIG. 1 exemplified in Example 1.

FIG. 17 shows another example of a 24-core ceramic plate 100. In the case of this example, the internal diameter of each guide hole 102 is 0.7 mm, and the distance between the pair of guide holes 102 is 4.6 mm. The internal diameter ϕ of each optical fiber insertion hole 103 is 80 μm, the pitch of the optical fiber insertion holes 103 is 125 μm, and 12 cores are provided to the left and right. The optical fiber insertion holes 103 are provided to the left and right that are apart by every 125 μm from the midpoint between the centers of the guide holes 102 (i.e., the pitch at the center is a two fold, or 250 μm).

FIG. 18 shows an example of a 32-core ceramic plate 100. In the case of this example, the internal diameter of each guide hole 102 is 0.55 mm, and the distance between the pair of guide holes 102 is 5.3 mm. The optical fiber insertion holes 103 are configured in two rows that are 0.25 mm apart from the center line connecting the centers of the guide holes 102, and the internal diameter ϕ of the optical fiber insertion holes 103 on each row is 125 μm, and the pitch of the optical fiber insertion holes 103 is 250 μm.

Note that the external dimensions of the ceramic plate 100 exemplified in FIG. 18 are the same as in FIG. 1 exemplified in Example 1.

FIG. 19 shows another example of a 32-core ceramic plate 100. In the case of this example, the internal diameter of each guide hole 102 is 0.55 mm, and the distance between the pair of guide holes 102 is 5.3 mm. The internal diameter ϕ of each optical fiber insertion hole 103 is 80 μm, the pitch of the optical fiber insertion holes 103 is 125 μm, and 16 cores are provided to the left and right. The optical fiber insertion holes 103 are provided to the left and right that are apart by every 125 μm from the midpoint between the centers of the guide holes 102 (i.e., the pitch at the center is a two fold, or 250 μm).

FIG. 20 shows an example of a 36-core ceramic plate 100. In the case of this example, the internal diameter of each guide hole 102 is 0.7 mm, and the distance between the pair of guide holes 102 is 4.6 mm. The optical fiber insertion holes 103 are configured in three rows that are on the center line connecting the centers of the guide holes 102, and on the line 0.25 mm apart from the center line, and the internal diameter ϕ of the optical fiber insertion holes 103 on each row is 125 μm, and the pitch of the optical fiber insertion holes 103 is 250 μm.

Note that the external dimensions of the ceramic plate 100 exemplified in FIG. 20 are the same as in FIG. 1 exemplified in Example 1.

Another example may be a configuration where three rows of 16 cores as an example of a 48-core ceramic plate 100. As exemplified in FIG. 21, a configuration may be adopted that includes seven rows of 12 cores as an example of a 84-core ceramic plate 100.

[Optical Module]

The optical module according to the present invention includes: the optical connector 12 that includes the ferrule 100; and the substrate 14 on which the optical connector 12 is mounted by reflow soldering. FIG. 10 is a schematic diagram of the optical module mounted on the substrate 14.

The ceramic plate 100 in this embodiment is fixed directly on or adjacent to the substrate 14, and connection can be achieved through a photoelectric conversion element 13 and the optical fibers 11. The photoelectric conversion element 13 may be a vertical cavity surface emitting laser (VCSEL: Vertical Cavity Surface Emitting LASER), a laser diode (LD), a photodetector (PD) or the like.

According to the ceramic plate 100 in this embodiment, the photoelectric conversion element 13 or a silicon optical waveguide may be mounted on the substrate 14, and an optical fiber assembly may be mounted close to the photoelectric conversion element 13 or the silicon optical waveguide, thus achieving optical connection.

The optical module may include: the photoelectric conversion element 13; the ferrule 100 having optical fiber insertion holes 103 at positions corresponding to the photoelectric conversion element 13; and the optical fibers 11 that are inserted into the respective optical fiber insertion holes 103 of the ferrule 100, and optically connected to the photoelectric conversion element 13. Optical waveguides can then be provided between the photoelectric conversion element 13 and the optical fibers 11.

A component to which the ceramic plate 100 in the embodiment in FIG. 10(*a*) is connected is not specifically limited. For example, connection is made to the existing MT ferrule 200 or the like, and the optical fibers 11' extending from the MT ferrule 200 can be routed to the side of housing 10. Through use of the after-mentioned jig 400, the ceramic plate 100 in this embodiment can be connected as the optical connector 12 using a typical MPO housing. In the housing, pressing springs may be embedded in order to mechanically connect the optical fibers 11.

The end face of the optical connector 12 may be polished at eight degrees to reduce the return loss. On the other hand, if no strict requirement for the connection loss is required because the connection distance is short and the number of optical connections is large or the like, the end face of the optical connector 12 may be polished orthogonally. If required, an antireflective film is applied on the connection end face, and orthogonal polishing may be adopted.

For optical implementation of an electronic circuit on the substrate 14, an optical transceiver including the photoelectric conversion element 13 may be provided at the end of the substrate 14, thus allowing connection to the optical connector 12 (FIG. 10(*a*)). An example of the optical transceiver may be what includes light receiving elements and light emitting elements, as the photoelectric conversion element 13, together with lenses, in a device holder. As for the device holder type optical transceiver, leads (or their FPC) of the photoelectric conversion element 13 are soldered on the substrate 14, and the optical transceiver is connected to the ferrule 100 attached to the receptacle fixed on the substrate 14.

FIG. 10(*b*) is a schematic diagram of the optical module mounted close to an electronic component 15 on the substrate 14. For implementation on an electronic board, it is preferable that an optical terminal should be arranged at a position closer to the electronic component 15. In this case, as shown in FIG. 10(*b*), the optical connector 12 that can be wired perpendicular to the substrate 14 may be adopted. Connection to a photoelectric conversion element 13' may be direct connection to a lens portion of an element, or indirect connection via a silicon optical waveguide.

FIG. 11(*a*) is a schematic diagram of the optical module mounted close to the electronic component 15 on the substrate 14. In this case, the ferrule 100 connects the photoelectric conversion element 13' attached on the substrate 14 to the optical fibers 11, and the optical fibers 11 are routed using a curved shape forming section 300 and maintaining a predetermined radius of curvature to become parallel with the substrate 14. Accordingly, without application of a load on the optical fibers 11, the optical connector 12 can be mounted close to the electronic component 15, such as a CPU.

Note that FIG. 11(*a*) shows the example where the ferrule 100 in this embodiment is at one end of each optical fiber 11, and the other end is at the general-purpose MT ferrule 200. Without any limitation to this configuration, also at the other end, the ferrule 100 in this embodiment may be adopted.

In a case where the one end of each optical fiber 11 is fixed to the substrate 14, and the other end is connected to another electronic device, the configuration as in FIG. 11(*a*) can be adopted. In this case, as shown in FIG. 11(*b*), a standardized MT ferrule is provided on the other end of each optical fiber 11, and the connection compatibility can be improved. As described above, the optical fibers provided with the MT ferrule on the other end can be implemented into any of various general-purpose connectors, such as an MPO connector. Accordingly, connection is easily made to optical fiber cables for various usages.

For example, in a case where one end of optical fiber 11 is implemented into the optical mounting circuit, the other end can be fixed to a housing 10 of a network switch (optical switch), a CPU server, a GPU server or the like, thus allowing connection from the outside. Accordingly, onboard optical communication can be performed between multiple servers or the like.

As shown in FIG. 11(*b*), the standardized MT ferrule is provided at the other ends of the optical fibers 11, thus allowing mutual connection between multiple optical mounting circuits even in a device, such as a server.

For example, in the case where the one ends of the optical fibers 11 are implemented in the optical mounting circuit, the standardized MT ferrule is provided at the other ends. Accordingly, optical mounting circuits conforming to various specifications can be easily connected via the MT ferrule.

(Jig 400)

FIGS. 23 and 24 show an example of the jig 400 for fixing the plate-like ferrule 100. FIG. 23 is a schematic diagram illustrating an example of the jig 400 for fixing the ferrule 100. FIGS. 24(*a*), 24(*b*), 24(*c*), 24(*d*), 24(*e*), and 24(*f*) respectively show a front view, a plan view, a right side view, a left side view, a bottom view, and a rear view thereof.

The jig 400 for allowing the end face of the ceramic plate 100 connected to the optical fibers 11 to be polished includes a jig main body 410 provided with a concave portion 402 through which the optical fibers 11 (including the tape) pass. Fixation holes are provided in the end face of the jig main body 410. The fixation holes are provided at positions aligned with the respective guide holes 102 provided in the ceramic plate 100. The guide pins are inserted into the fixation holes and the guide holes 102, and position the plate to the jig main body 410, thus allowing fixation.

In a state where the ceramic plate 100 according to the present invention is fixed to the jig 400, the connection end face of the ceramic plate 100 may be polished using a polishing tool, such as a grinding machine.

The connection end faces of the ceramic plate 100 and the MT ferrule 200 are subjected to any of oblique 8-degree protruding polishing, orthogonal surface polishing, or orthogonal protruding polishing. The end face polishing of the ceramic plate 100 is stabilized similarly to that of the MT ferrule. Accordingly, variation in connection due to attachment and detachment can be eliminated.

The ceramic plate 100 can be coupled to the jig 400 using the guide pins. If required, the ceramic plate 100 may be fixed to the jig 400 using an adhesive or the like.

The jig 400 exemplified in FIGS. 23 and 24 is fabricated to have an external shape having the same dimensions as those of an internationally standardized MT ferrule in a case of combination with the ceramic plate 100, thereby allowing such a combination to enter an existing polishing machine and to be optically polished. For example, in the case of the ceramic plate 100 exemplified in FIG. 1, the thickness is 0.5 mm. Accordingly, the external shape of the jig 400 may be a shape of a standard MT ferrule with the connection end face side being shortened by about 0.5 mm.

Note that the jig 400 according to the present invention may be used as a temporary holder for optical polishing. After completion of optical polishing, the ceramic plate 100 may be detached from the jig 400, and the ceramic plate 100 may be used for optical connection.

As described later, as for the jig 400 according to the present invention, after completion of optical polishing, the ceramic plate 100 may be used for optical connection in a state where the jig 400 and the ceramic plate 100 are joined to each other.

(Application to Existing Optical Connector)

FIG. 25 shows a schematic diagram illustrating an example where the ceramic plate 100 is implemented in an MPO connector 500. The MPO connector is a connector for collectively connecting a plurality of optical fibers 11, and is a connector internationally standardized, and widely and generally used.

As shown in FIG. 25, guide pins of a pin keeper 540 are inserted into the ceramic plate 100 fixed by the jig 400. Furthermore, a spring 530, a spring bush 520, and an MPO boot 510 are passed through the optical fibers 11.

The jig 400 exemplified in FIG. 24 is fabricated to have the same dimensions as those of a standardized MT ferrule when being combined with the ceramic plate 100. Accordingly, the jig 400 as it is can be implemented into an MPO housing 550. Consequently, even in a case where a connection target is an existing MT ferrule, use of the MPO connector 500 can easily allow optical connection, and reliably achieve connection compatibility.

FIG. 26(*a*) shows a schematic enlarged diagram illustrating an example where the ceramic plate 100 is implemented in the MPO connector 500. The guide pins are fixed on the connection end face side of the pin keeper 540. The guide pins are inserted into the jig 400, and also into the ceramic plate 100.

FIG. 26(*b*) shows an example where instead of the jig 400, an existing MT ferrule 450 is used. The MT ferrule 450 is internationally standardized. The connection end face can be optically polished by a polishing machine. The ferrule can be implemented into the MPO connector 500.

In the aforementioned embodiment, the example is described where the ceramic plate 100 is provided on the end faces of the optical fibers 11, and allowed to operate as a cable connection member (for example, the A surface is used as the connector connection surface, and the B surface is used as the fiber insertion side). However, the ceramic plate 100 according to the present invention can be not only used as the cable connection member, but also used as what has a block shape with both the A surface and the B surface serving as contact faces, for example. In this case, it is also used for usage of connecting the optical elements to each other, for example.

In the present invention, the ferrule 100 or the ceramic plate 100 corresponds to "ferrule" or "plate", the optical fibers 11 correspond to "optical fibers", the optical fiber insertion holes 103 correspond to "optical fiber insertion holes", the guide holes 102 correspond to "guide holes", the beveled part (C surface) 110 or the identification through-hole 111 corresponds to "surface identification structure", the thin portion 123 corresponds to "thin portion", the thick portion 122 corresponds to "thick portion", the guide grooves (concave grooves) 121 correspond to "guide grooves", the adhesive reservoir 130 corresponds to "adhesive reservoir", the small hole 141 corresponds to "small hole", and the large hole 142 corresponds to "large hole".

Although the preferable one embodiment of the present invention is as described above, the present invention is not limited only to this. It should be understood that various embodiments without departing from the spirit and scope of the present invention can be made. Furthermore, in this embodiment, the operation and advantageous effects due to the configuration of the present invention are described. However, these operation and advantageous effects are only examples, and do not limit the present invention.

REFERENCE SIGNS LIST

10 Housing
11 Optical fiber
12 Optical connector
13 Photoelectric conversion element
14 Substrate
15 Electronic component
100 Ferrule (ceramic plate)
102 Guide hole
103 Optical fiber insertion hole
110 Beveled part, C surface
121 Guide groove (concave groove)
122 Thick portion
123 Thin portion
130 Adhesive reservoir
140 Different-diameter structure
141 Small hole
142 Large hole
200 MT ferrule
300 Curved shape forming section
400 Jig

The invention claimed is:

1. An optical fiber assembly, comprising:

a plate-like ferrule that is formed of ceramics, and has optical fiber insertion holes and guide holes for insertion of a guide pin; and optical fibers inserted into the optical fiber insertion holes of the ferrule, wherein the ceramics has a hardness lower than a hardness of the optical fiber, the optical fiber assembly has a connection end face at which the optical fibers are fixed to the optical fiber insertion holes of the ferrule with an adhesive filled in the optical fiber insertion holes, the optical fibers and the ferrule at the connection end face are polished surfaces, and at the polished surfaces, distal ends of the optical fibers protrude to have convex shapes, which allows physical contact connection when optically connected, in which the convex shapes of the optical fibers come into contact with each other and are deformed.

2. The optical fiber assembly according to claim 1, wherein the ceramics includes machinable ceramics, and the optical fiber contains quartz glass.

3. The optical fiber assembly according to claim 1, wherein the ferrule is a multi-fiber optical connector ferrule that has at least 12 optical fiber insertion holes.

4. The optical fiber assembly according to claim 1, wherein an amount of dimensional variation of the ferrule heated at 260° C. is no more than 0.5 μm.

5. The optical fiber assembly according to claim 1,
wherein the ferrule includes a plate main body formed to have a rectangular shape, and
a surface identification structure is formed at one corner of the plate main body.

6. The optical fiber assembly according to claim 1, wherein an optical connector is connected to another end of the optical fiber, and
the optical connector is an MT connector that includes an MT ferrule.

7. The optical fiber assembly according to claim 1,
wherein each one of the optical fiber insertion holes is a cylindrical shape,
the optical fibers are one or more optical fibers arranged in a tape-like configuration, and a tape of the optical fibers are arranged in parallel to a pair of the guide holes.

8. The optical fiber assembly according to claim 1, further comprising a jig for attaching the ferrule when polishing,
wherein the jig is fixed at a side of the optical fiber insertion end face of the ferrule, and
the jig comprises: a concave portion through which the optical fibers pass while the optical fibers are exposed; and
fixation holes at positions aligned with the respective guide holes.

9. A plate-like ferrule comprising: a plurality of optical fiber insertion holes; guide holes for insertion of a guide pin; a connection end face; and an optical fiber insertion end face,
wherein the optical fiber insertion holes and the guide holes penetrate between the connection end face and the optical fiber insertion end face,
the ferrule is formed of ceramics having a hardness of no more than 8.0 GPa,
the ferrule includes a thin portion where a plate main body formed to have the optical fiber insertion holes has a small thickness, and a thick portion, and
guide grooves that communicates with the optical fiber insertion holes are formed in an upper end face of the thick portion, the upper end face contacting with the thin portion.

10. The ferrule according to claim 9,
wherein at least two rows of the optical fiber insertion holes are arranged,
the thin portion has at least two thicknesses, and
the guide grooves are provided stepwise on each row of the optical fiber insertion holes.

11. The ferrule according to claim 9, wherein an adhesive reservoir including the optical fiber insertion holes is provided in the optical fiber insertion end face the plate main body in a concave manner.

12. The ferrule according to claim 9,
wherein a diameter of the guide hole at the optical fiber insertion end face is larger than a diameter of the guide hole at the connection end face, and
the diameter of the guide hole at the connection end face is constant from the connection end face toward the optical fiber insertion end face at a depth equal to or more than a half of a thickness of the ferrule.

13. The ferrule according to claim 9, wherein the plate main body has a thickness ranging from 0.3 to 3.0 mm, inclusive.

14. An optical module, comprising: a substrate; a photoelectric conversion element mounted on the substrate; and the optical fiber assembly according to claim 1 that is mounted close to the photoelectric conversion element or a silicon optical waveguide,
wherein the photoelectric conversion element or the silicon optical waveguide is optically connected to the optical fibers of the optical fiber assembly.

15. A ferrule in an optical fiber assembly in which distal ends of optical fibers protrude from a polished surface at a connection end face of the ferrule to enable physical contact connection,
wherein the ferrule is a plate made of ceramics,
the ferrule has:
a plurality of optical fiber insertion holes; and guide holes for guide pin insertion, and
the ferrule has a hardness of no more than 8.0 GPa, which is lower than a hardness of the optical fibers to be inserted in the optical fiber insertion holes.

16. The ferrule according to claim 15, wherein the number of optical fiber insertion holes is at least 12.

17. The ferrule according to claim 15, wherein an amount of dimensional variation in a case of heating at 260° C. is no more than 0.5 μm.

18. The ferrule according to claim 15, comprising a plate main body that is formed to have a rectangular shape and has a thickness ranging from 0.3 to 3.0 mm, inclusive, wherein a machined portion achieved through a machining process is formed at the plate main body.

19. The ferrule according to claim 18, wherein the machined portion is a surface identification structure formed at a corner of the plate main body.

20. The ferrule according to claim 18, wherein the machined portion includes a thin portion where the plate main body formed to have the optical fiber insertion holes has a small thickness, and a thick portion, and guide grooves that communicates with the optical fiber insertion holes are formed in an upper end face of the thick portion.

21. The ferrule according to claim 18, wherein the machined portion includes an adhesive reservoir formed in a surface of the plate main body having the optical fiber insertion holes.

22. The ferrule according to claim 18, wherein the guide hole is formed to have a hat-shaped cross section, and has a small hole, and a large hole formed around the small hole.

23. An optical connector comprising:
a plate-like ferrule that is formed of ceramics, and has optical fiber insertion holes and guide holes for insertion of a guide pin;
optical fibers inserted into the optical fiber insertion holes of the ferrule; and
a jig for fixing the ferrule and forming a shape of a MT ferrule,
wherein the ceramics has a hardness lower than a hardness of the optical fiber,
the optical connector has a connection end face at which the optical fibers are fixed to the optical fiber insertion holes of the ferrule with an adhesive filled in the optical fiber insertion holes,
the optical fibers and the ferrule at the are polished surfaces, and
at the polished surfaces, distal ends of the optical fibers protrude to have convex shapes, which allows physical contact connection when optically connected, in which the convex shapes of the optical fibers come into contact with each other and are deformed.

24. A method for forming the connection end face of the optical fiber assembly according to claim 1, comprising:

a step of fixing the ferrule to a jig, wherein the optical fibers are fixed to the optical fiber insertion holes of the ferrule;

a step of optically polishing the connection end face of the ferrule which is fixed to the jig, using an optical connector polisher; and a step of removing the jig from the ferrule after the step of optically polishing.

25. A method for manufacturing an optical fiber assembly, using a plate main body made of ceramics and optical fibers having a hardness harder than the plate main body, the method comprising:

an applying step of applying an adhesive to an insertion surface of the plate main body;

an inserting step of inserting the optical fibers in optical fiber insertion holes provided to the plate main body from a side of the insertion surface, and extruding the adhesive at the side of the insertion surface toward a side of a connection end surface;

an adhesive adjusting step of orienting distal ends of the inserted optical fibers upward to allow the adhesive adhering the optical fibers to be returned to a side of the optical fiber insertion holes;

a curing step of curing the adhesive adjusted in the adhesive adjusting step; and a polishing step of optically polishing the side of the connection end surface of the plate main body to allow physical contact connection.

* * * * *